US012798814B2

(12) United States Patent
Bulgarelli et al.

(10) Patent No.: US 12,798,814 B2
(45) Date of Patent: Nov. 17, 2026

(54) EVALUATING THE SEALING QUALITY OF A SEALING STRIP SEALED TO A PACKAGING WEB IN A PACKAGING MACHINE

(71) Applicant: TETRA LAVAL HOLDINGS & FINANCE S.A., Pully (CH)

(72) Inventors: Daniele Bulgarelli, Modena (IT); Tajinder Singh, Modena (IT); Matteo Drusiani, Modena (IT); Jacopo Cavalaglio Camargo Molano, Modena (IT)

(73) Assignee: TETRA LAVAL HOLDINGS & FINANCE S.A., Pully (CH)

(*) Notice: Subject to any disclaimer, the term of this patent is extended or adjusted under 35 U.S.C. 154(b) by 71 days.

(21) Appl. No.: 18/865,183

(22) PCT Filed: May 29, 2023

(86) PCT No.: PCT/EP2023/064319
§ 371 (c)(1),
(2) Date: Nov. 12, 2024

(87) PCT Pub. No.: WO2024/012762
PCT Pub. Date: Jan. 18, 2024

(65) Prior Publication Data

US 2025/0108949 A1 Apr. 3, 2025

(30) Foreign Application Priority Data

Jul. 14, 2022 (EP) .................................... 22184904

(51) Int. Cl.
*B65B 51/30* (2006.01)
*B65B 9/20* (2012.01)
(Continued)

(52) U.S. Cl.
CPC ................ *B65B 51/30* (2013.01); *B65B 9/20* (2013.01); *B65B 57/02* (2013.01);
(Continued)

(58) Field of Classification Search
CPC ........... B65B 51/30; B65B 9/20; B65B 57/02; B65B 2051/105; G01N 21/8851; G01N 21/90
See application file for complete search history.

(56) References Cited

U.S. PATENT DOCUMENTS

2022/0114720 A1* 4/2022 Weinstein ............. G06V 10/56

FOREIGN PATENT DOCUMENTS

| | | |
|---|---|---|
| EP | 0414414 A2 | 2/1991 |
| WO | 2006064701 A1 | 6/2006 |

OTHER PUBLICATIONS

International Search Report (PCT/ISA/210) and Written Opinion (PCT/ISA/237) mailed on Aug. 16, 2023, by the European Patent Office as the International Searching Authority for International Application No. PCT/EP2023/064319. (9 pages).

* cited by examiner

*Primary Examiner* — Georgia Y Epps
*Assistant Examiner* — Don J Williams
(74) *Attorney, Agent, or Firm* — BUCHANAN INGERSOLL & ROONEY PC

(57) ABSTRACT

An automatic heat-sealing quality control system to automatically control a quality of a heat-sealing of a sealing strip to a longitudinal edge of a packaging web at a heat-sealing station in a packaging machine, where sealed packages containing pourable food products are continuously produced from a continuous vertical tube filled with the pourable food product and formed by longitudinally folding the packaging web to overlap longitudinal edges thereof and then heat-sealing the overlapping longitudinal edges. The
(Continued)

system comprises a thermal imaging camera designed to operate in the electromagnetic spectrum invisible to human eye to capture and output thermal digital images.

12 Claims, 19 Drawing Sheets

(51) Int. Cl.
*B65B 57/02* (2006.01)
*G01N 21/88* (2006.01)
*G01N 21/90* (2006.01)
*B65B 51/10* (2006.01)

(52) U.S. Cl.
CPC ......... *G01N 21/8851* (2013.01); *G01N 21/90* (2013.01); *B65B 2051/105* (2013.01)

Macro Defects

Micro Defects

EVALUATING THE SEALING QUALITY OF A SEALING STRIP SEALED TO A PACKAGING WEB IN A PACKAGING MACHINE

TECHNICAL FIELD OF THE INVENTION

The present invention is directed in general to packaging of pourable food product by sequentially transversely sealing a web-fed packaging material tube continuously filled with pourable food product.

More specifically, the present invention is directed to evaluating the sealing quality of a sealing strip heat-sealed to a packaging web in a packaging machine operable to produce sealed packages containing pourable food product.

The present invention is further directed to calibrating cameras used for evaluating the sealing quality of the sealing strip.

STATE OF THE ART

As is known, many pourable food products, such as fruit or vegetable juice, pasteurized or UHT (ultra-high-temperature treated) milk, wine, etc., are sold in packages made of sterilized packaging material.

A typical example of this type of package is the parallelepiped-shaped package for pourable food products known as Tetra Brik Aseptic®, which is made by folding and sealing laminated strip packaging material.

The packaging material has a multilayer sheet structure substantially comprising one or more stiffening and strengthening base layers typically made of a fibrous material, e.g. paper or cardboard, or mineral-filled polypropylene material, covered on both sides with one or more heat-seal plastic material layers, e.g. polyethylene film. In the case of aseptic packages for long-storage products, such as UHT milk, the packaging material also comprises a gas- and light-barrier material layer, e.g. aluminum foil or ethyl vinyl alcohol (EVOH) film, which is superimposed on a heat-seal plastic material layer, and is in turn covered with another heat-seal plastic material layer forming the inner face of the package eventually contacting food product.

Packages of this sort are normally produced on fully automatic packaging machines, also known as filling machines, of the type shown in FIG. 1 and referenced as a whole with reference numeral 1, where a continuous vertical tube 2 is formed from a packaging web 3, which is sterilized by applying, e.g., a chemical sterilizing agent such as a hydrogen peroxide solution, or physical sterilization, such as by means of an electron beam. Once sterilization is completed, any residue, in particular left by the chemical sterilizing agent, is removed, e.g. evaporated by heating, from the surfaces of the packaging material. The packaging web 3 is maintained in a closed, sterile environment, in particular within an isolation chamber and is folded and then heat-sealed longitudinally to form the vertical tube 2.

The vertical tube 2 is filled with a sterilized or sterile-processed pourable food product by means of a filling pipe extending inside the vertical tube 2. The vertical tube 2 is advanced along a vertical advancing direction to a forming station, where it is gripped along equally spaced transversal sections by a jaw system including two or more pairs of jaws acting cyclically and successively on the vertical tube 2 to form a continuous sequence of pillow packs 4 connected to one another by transverse sealing bands. Pillow packs 4 are then separated from one another by cutting the sealing bands and are conveyed to a folding station, where they are folded mechanically into finished, e.g. substantially parallelepiped-shaped, packages 5.

To prevent the longitudinal edges or borders of the packaging web 3, in particular the fibrous material in the multilayer sheet structure of the packaging web 3 exposed to the external environment, from coming into contact with and absorbing the pourable food product in the vertical tube 2 first and in the pillow packs 4 then, prior to folding and longitudinally sealing the packaging web 3 to form the vertical tube 2, the longitudinal edges of the packaging web 3 are fluidly isolated by heat-sealing a web-fed sealing strip 6 of heat-seal plastic material to the packaging web 3 at a heat-sealing station 7.

In an embodiment shown in FIG. 2, the sealing strip 6 is flat and a first longitudinal side portion thereof is first heat-sealed to an inner face of a longitudinal side portion of the packaging web 3, which is then folded so as to bring the opposite longitudinal edges thereof in contact, and then the remaining (loose) longitudinal portion of the sealing strip 6 that projects from the longitudinal edge of the packaging web 3 and is not heat-sealed thereto is heat-sealed to the inner face of the opposite longitudinal side portion of the packaging web 3. In this embodiment, the heat-sealing of the sealing strip 6 to the opposite longitudinal side portion of the packaging web 3 results in the packaging web 3 being also longitudinally heat-sealed to form the vertical tube 2. The package 5 shown in FIG. 3 is then formed as described above.

In a different embodiment shown in FIG. 4, the sealing strip 6 is U- or C-shaped and the package 5 shown in FIG. 5 is formed.

FIG. 6 schematically shows operations carried out at the heat-sealing station 7 to heat-seal the U-shaped sealing strip 6 to the packaging web 3.

As shown in FIG. 6, the packaging web 3 and the sealing strip 6 are first web-fed to the heat-sealing station 7, where they are heated by a first heating unit 8 and then advanced to a first pressure roller 9 that pressure-seals a first longitudinal side portion of the sealing strip 6 onto either the inner or the outer (or décor) face of a longitudinal (narrow) side portion of the packaging web 3, that, after the vertical tube 2 has been formed, remains arranged inside the vertical tube 2, and leaving a second (loose) longitudinal portion of the sealing strip 6 projecting from the longitudinal edge of the packaging web 3.

The packaging web 3 and the sealing strip 6 are then advanced to a second heating unit 10, where the second longitudinal portion of the sealing strip 6 that projects from the first longitudinal side portion of the packaging material 3 and is not heat-sealed to the packaging web 3 is heated, along with the opposite face of the longitudinal side portion of the packaging web 3 to that to which the first longitudinal side portion of the sealing strip 6 has been heat-sealed.

The packaging web 3 and the sealing strip 6 are then advanced to a U-folding unit 11, where the second longitudinal portion of the sealing strip 6 is first U-folded around the longitudinal edge of the packaging web 3 and then pressure-sealed to the opposite face of the longitudinal side portion of the packaging web 3 by a second pressure roller (not shown).

Resultingly, while the first and second longitudinal portion of the sealing strip 6 are heat-sealed the packaging web 3, the longitudinal central portion of the sealing strip 6 is not heat-sealed to the packaging web 3 and forms a loop that develops around, and fluidly isolate, the longitudinal edge of the packaging web 3 that, after the vertical tube 2 has been formed, remains arranged inside the vertical tube 2.

OBJECT AND SUMMARY OF THE INVENTION

To guarantee that the packages 5 containing the pourable food product meet prescribed sealing requirements, the sealing strip 6 is to be heat-sealed to the packaging web 3 in compliance with prescribed quality requirements in terms of geometrical accuracy and adhesion.

To the Applicant's best knowledge, the quality of the heat-sealing of the sealing strip 6 to the packaging web 3 is currently qualitatively and/or quantitatively coarsely checked via a visual inspection in search of characteristic low heat-sealing quality marks or patterns and/or a mechanical, e.g., a tensile, test, respectively, made by an appropriately trained operator.

The Applicant has found that, although satisfactory in many respects, the current heat-sealing quality check made by an appropriately trained operator has margins of improvement and hence a need is felt by the Applicant to develop a technology that allows this quality check to be improved.

The aim of the present invention is hence to develop a technology that allows the quality of the heat-sealing of the sealing strip to the packaging material to be to be automatically evaluated, thereby reducing involvement of human operators.

This aim is achieved by the present invention, that relates to an automatic sealing quality control system and to a packaging machine comprising the same, as claimed in the appended claims.

DETAILED DESCRIPTION OF THE INVENTION

The present invention will now be described in detail with reference to the accompanying drawings to enable a skilled person to realize and use it. Various modifications to the embodiments presented shall be immediately clear to persons skilled in the art and the general principles disclosed herein could be applied to other embodiments and applications but without thereby departing from the scope of protection of the present invention as defined in the appended claims. Therefore, the present invention should not be considered limited to the embodiments described and shown, but should be granted the widest protective scope in accordance with the features described and claimed.

Where not otherwise defined, all the technical and scientific terms used herein have the same meaning commonly used by persons of ordinary skill in the field pertaining to the present invention. In the event of a conflict, this description, including the definitions provided, shall be binding. Furthermore, the examples are provided for illustrative purposes only and as such should not be considered limiting.

In particular, the block diagrams included in the accompanying figures and described below are not to be understood as a representation of the structural features, or constructive limitations, but must be interpreted as a representation of functional characteristics, properties that is, intrinsic properties of the devices and defined by the effects obtained or functional limitations that can be implemented in different ways, therefore in order to protect the functionalities thereof (possibility of functioning).

In order to facilitate understanding of the embodiments described herein, reference will be made to some specific embodiments and a specific language will be used to describe them. The terminology used herein is for the purpose of describing only particular embodiments, and is not intended to limit the scope of the invention.

Figure 1:
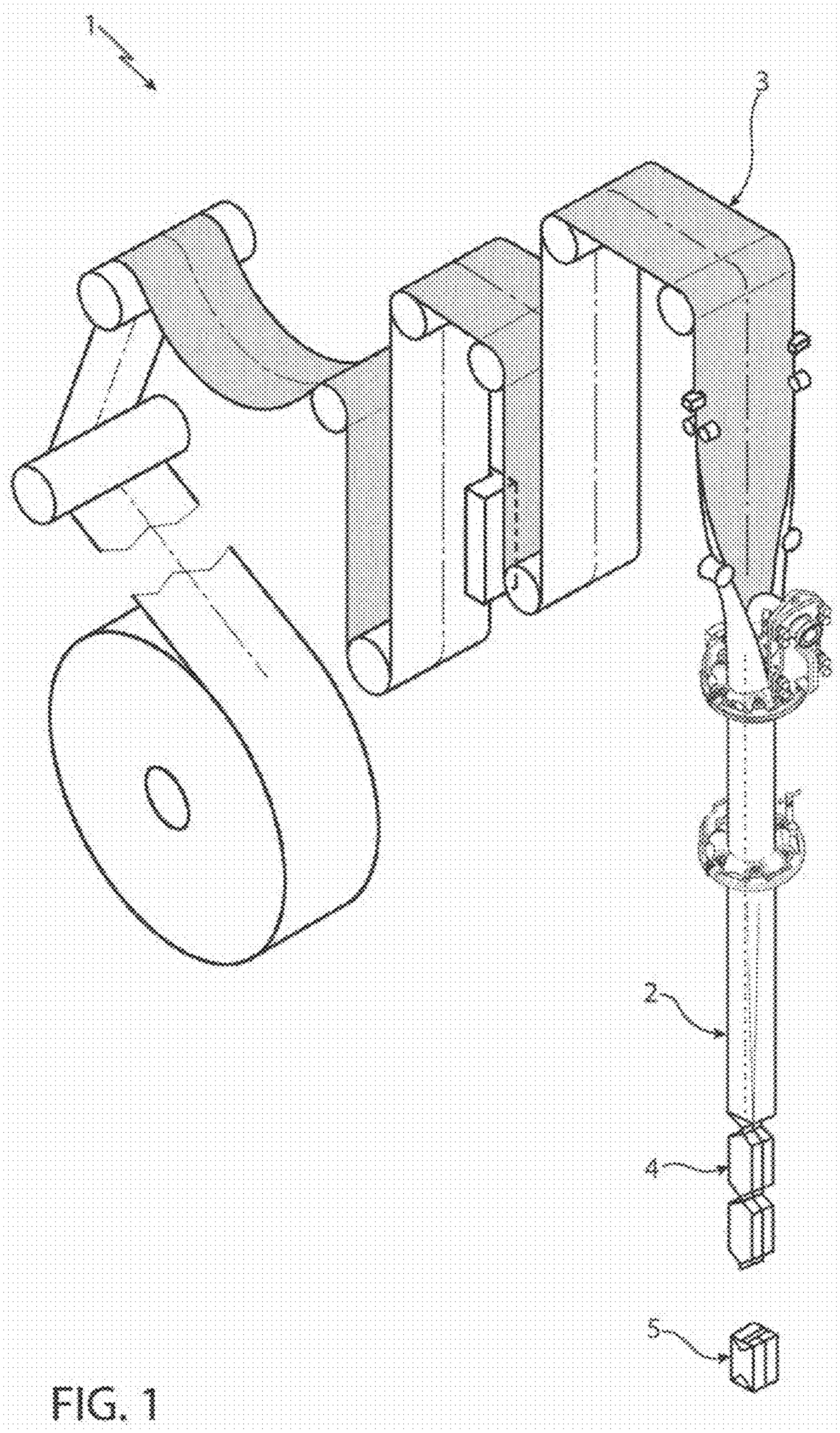
FIG. 1 shows a perspective view, with parts removed for clarity, of a packaging machine operable to produce sealed packages containing pourable food products from a tube of packaging material.
Figure 3:
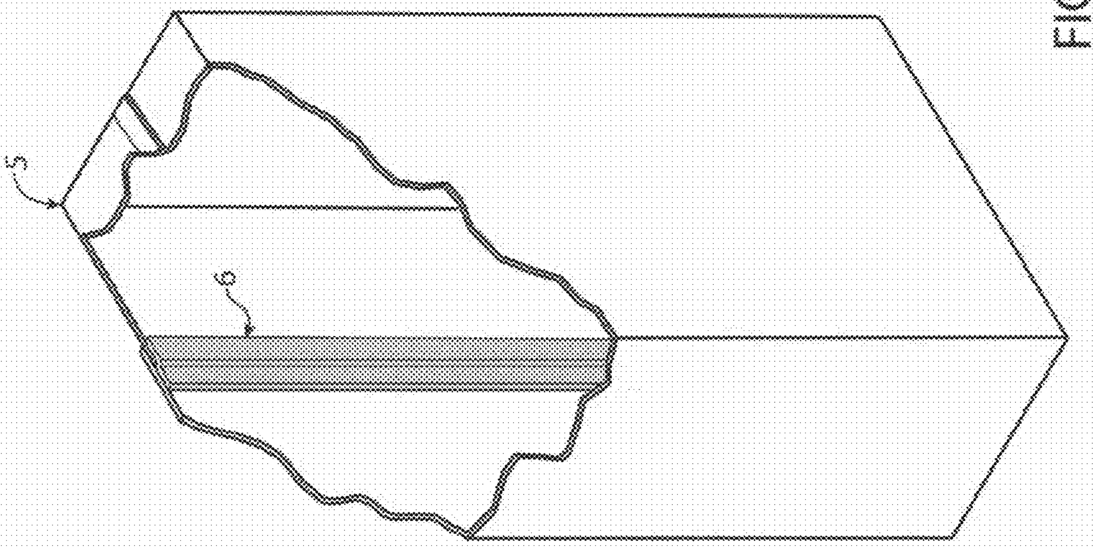
FIGS. 2 and 3 schematically show the heat-sealing of a tape sealing strip to a packaging web and the resulting sealed package, respectively.
Figure 2:
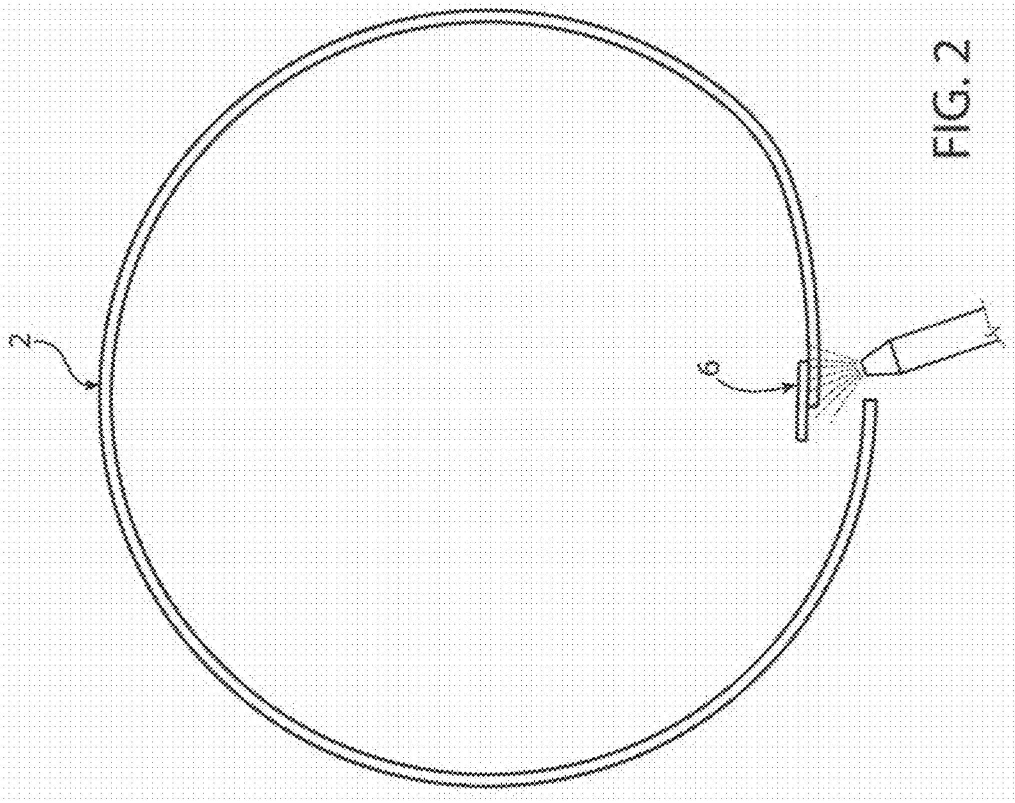
Figure 5:
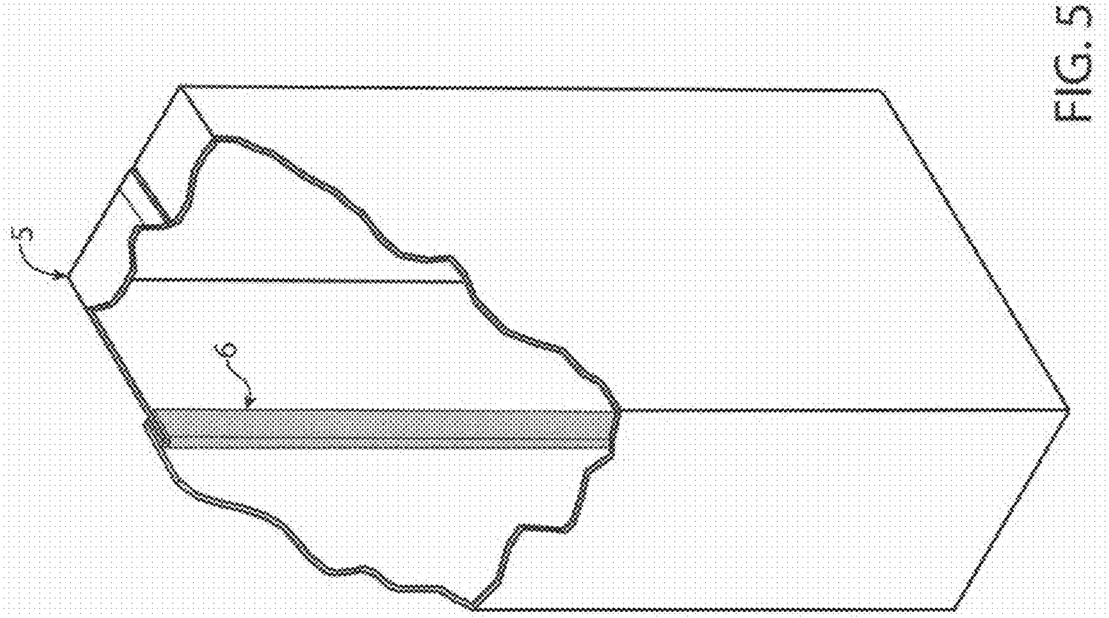
FIGS. 4 and 5 schematically show the heat-sealing of a U-shaped sealing strip to a packaging web and the resulting sealed package, respectively.
Figure 4:
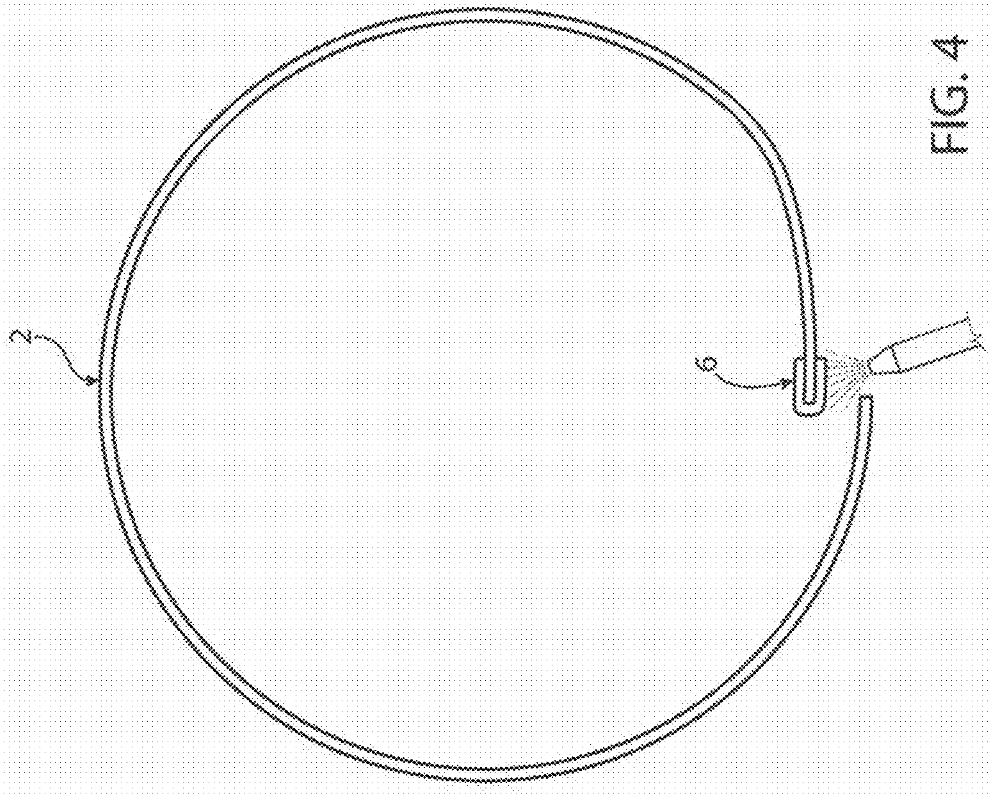
Figure 6:
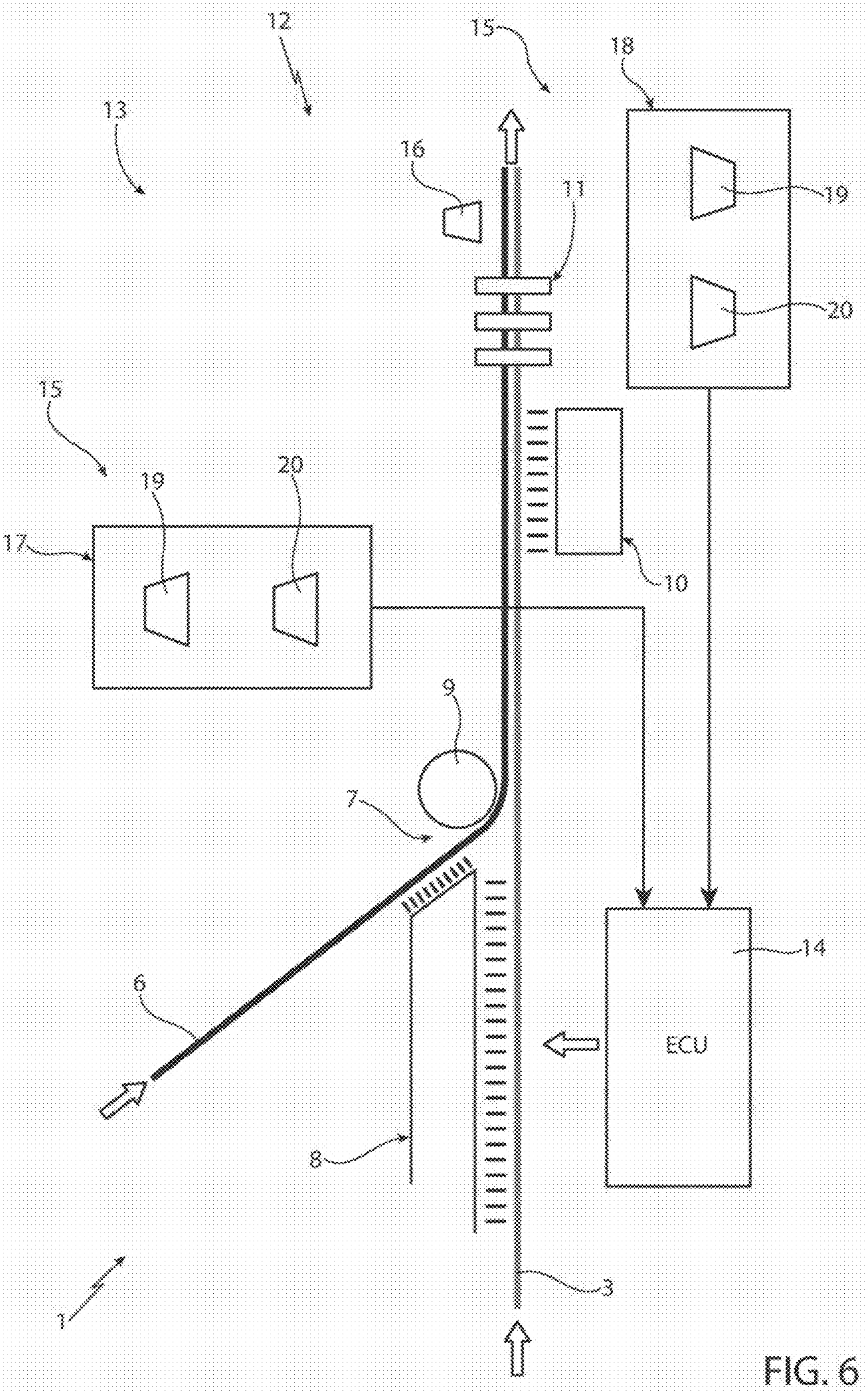
FIG. 6 schematically shows a heat-sealing station where a sealing strip is heat-sealed to a packaging web and the quality of the heat-sealing is automatically checked by an automatic heat-seal quality control system.

Starting again from FIG. 6, the packaging machine 1 is further equipped with an automatic heat-sealing quality control system 12 designed to automatically detect and identify (recognize/classify) any faults that may have occurred during the heat-sealing of the sealing strip 6 to the packaging web 3 and that may result in the longitudinal sealing of the packages 5 being or becoming fluid-tight defective, and to evaluate the quality of the heat-seal of the sealing strip 6 to the packaging web 3 based on the outcome of the identified faults, if any.

The automatic heat-sealing quality control system 12 comprises:

- a sensory system 13 arranged at the heat-sealing station 7 to output an output that allows any faults that may have occurred during the heat-sealing of the sealing strip 6 to the packaging web 3 to be automatically detected and identified, thus allowing the quality of the heat-sealing of the sealing strip 6 to the longitudinal edge of the packaging web 3 to be automatically evaluated based on the identified faults, if any; and
- electronic computing resources 14 designed to communicate with, in particular electrically connected to, the sensory system 13 to control operation thereof and to receive and process the output thereof to automatically detect and identify any faults that may have occurred during the heat-sealing of the sealing strip 6 to the packaging web 3 and to evaluate the quality of the heat-seal of the sealing strip 6 to the packaging web 3 based on the identified faults, if any.

The sensory system 13 comprises an industrial artificial vision system 15, also known as computer vision system, operable to capture digital images of the packaging web 3 and of the sealing strip 6. The artificial vision system 15 is an electronic equipment that performs machine vision functions and features one or more digital cameras equipped with an integrated or external image acquisition and processing system, an internal and/or external software to the camera and a lighting system, The sensory system 13 may optionally comprise a pyrometer 16 to remote sense the temperatures of the packaging material 3 and of the sealing strip 6.

The artificial vision system 15 comprises either one or both of:

- a first electronic digital image capture device 17 arranged near the first pressure roller 9 to output an output that allows any faults that may have occurred during the heat-sealing of the first longitudinal side portion of the sealing strip 6 to the longitudinal side portion of the packaging web 3 to be automatically detected and identified; and
- a second electronic digital image capture device 18 arranged near the second pressure roller to output an output that allows any faults that may have occurred during the heat-sealing of the second longitudinal side portion of the sealing strip 6 to the longitudinal side portion of the packaging material 3 to be automatically detected and identified.

Each electronic digital image capture device 17, 18 comprises a respective pair of digital image sensors in the form of commercially available digital cameras arranged to capture digital images of the packaging material 3 and of the sealing strip 6 heat-sealed thereto.

In particular, each electronic digital image capture device 17, 18 comprises:

- a first digital camera 19 designed to operate in the electromagnetic spectrum visible to the human eye, hereinafter briefly referred to as visible-light imaging camera, to capture and output digital images, hereinafter briefly referred to as visible-light digital images; and
- a second digital camera 20 designed to operate in the electromagnetic spectrum invisible to the human eye, in particular in the infrared spectrum, hereinafter briefly referred to as thermal imaging camera (also known as thermographic, thermal-imaging or IR camera or imager), to capture and output digital images, hereinafter briefly referred to as thermal digital images.

The visible-light and thermal imaging cameras 19, 20 of the first electronic digital image capture device 17 are arranged with respect to the packaging web 3 and the sealing strip 6 heat-sealed thereto such that their fields of view (FOV) are such as to cause the visible-light and thermal imaging cameras 19, 20 to capture visible-light and thermal digital images of one and the same area of the face of the packaging material 3 and of the sealing strip 6 heat-sealed thereto where the first longitudinal side portion of the sealing strip 6 is first heat-sealed.

Similarly, the visible-light and thermal imaging cameras 19, 20 of the second electronic digital image capture device 18 are arranged with respect to the packaging web 3 and the sealing strip 6 heat-sealed thereto such that their fields of view (FOV) are such as to cause the visible-light and thermal imaging cameras 19, 20 to capture visible-light and thermal digital images of one and the same area of the opposite face of the packaging material 3 where the second longitudinal side portion of the sealing strip 6 is then heat-sealed.

The electronic computing resources 14 may have either a concentrated architecture, i.e., may be in the form of a single electronic processing unit, to which both the electronic digital image capture devices 17, 18 may be connected, or a distributed architecture, i.e., may be in the form of two or different communicating and co-operating electronic processing units, to which the individual digital cameras of the electronic digital image capture devices 17, 18 may be connected, depending on the hardware and software architectures that the manufacturer deems appropriate to control the heat-seal quality.

The electronic computing resources 14 are configured to simultaneously or successively operate each electronic digital image capture device 17, 18 in subsequent time instants during the movement of the packaging web 3 and of the sealing strip 6 heat-sealed thereto, whereby each electronic digital image capture device 17, 18 carries out a sequence of digital image multi-capture operations, during each of which the visible-light and thermal imaging cameras 19, 20 of each electronic digital image capture devices 17, 18 are operated simultaneously or successively to capture a pair of visible-light and thermal digital images, i.e., a pair of digital images comprising one visible-light digital image and one thermal digital image, of one and the same area of the packaging material 3 and of the sealing strip 6 heat-sealed thereto in the fields of view of the the visible and thermal imaging cameras 19, 20.

Figure 9:
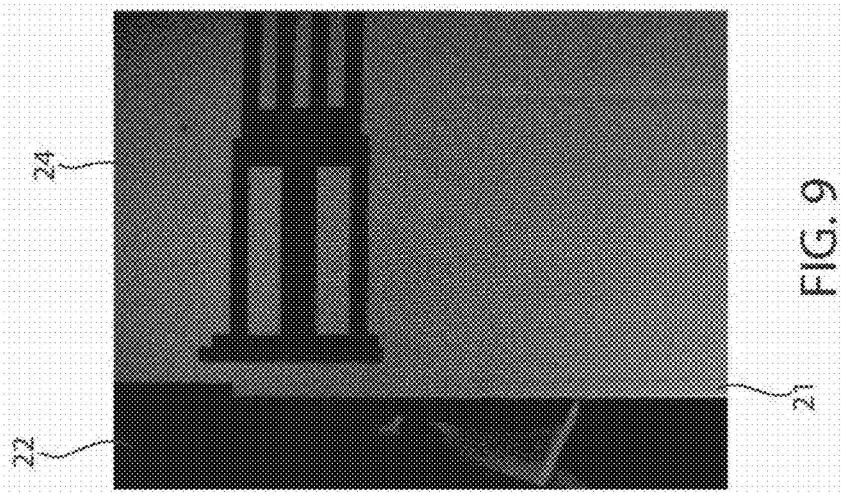
FIGS. 7 to 9 exemplarily show visible-light and thermal digital images captured by visible and thermal imaging cameras of the automatic heat-seal quality control system.
Figure 8:
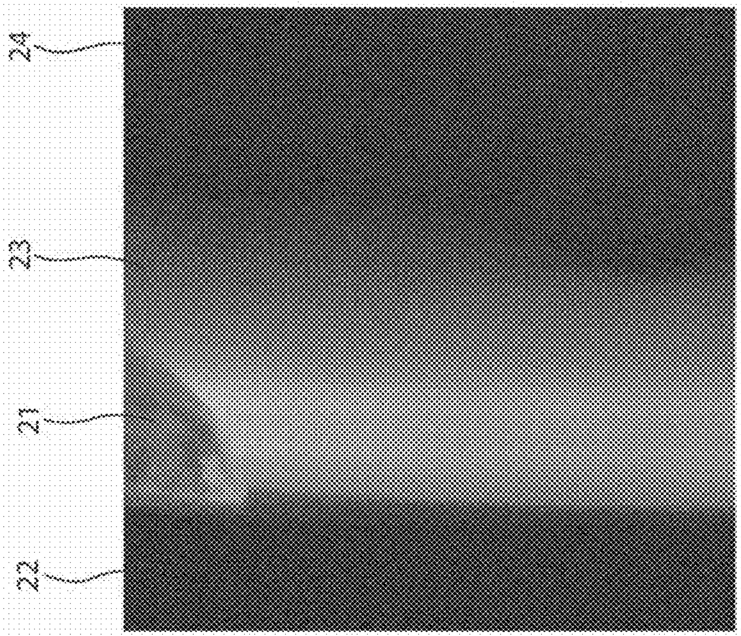
Figure 7:
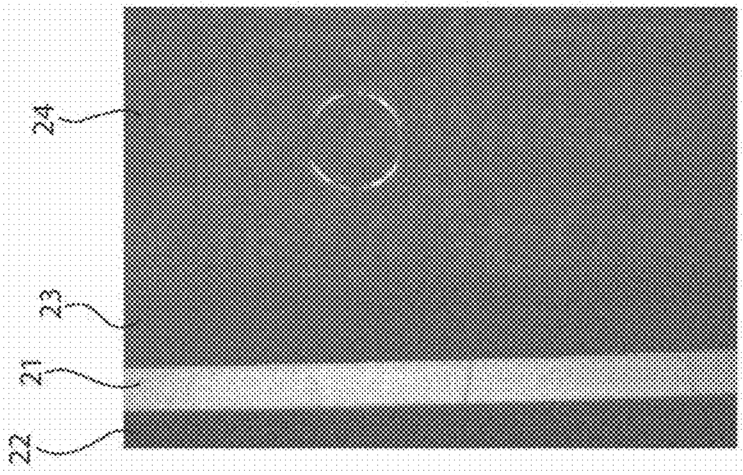

FIGS. 7 to 9 exemplarily show the visible-light and thermal digital images captured by the visible-light and thermal imaging cameras 19, 20.

In particular, FIG. 7 exemplarily shows a visible-light digital image of an area of the inner side of the packaging material 3 and captured by the visible-light imaging camera 19 of the first electronic digital image capture device 17 after the first longitudinal side portion of the sealing strip 6 has been heat-sealed. In the image, the narrower light-grey vertical stripe 21 represents the entire sealing strip 6, including both the first longitudinal side portion heat-sealed to the longitudinal side portion of the packaging material 3 and the second (loose) longitudinal side portion projecting from the longitudinal edge of the packaging material 3. The narrower dark-grey stripe 22 on the left of the light-grey vertical stripe represents the background. The wider dark-grey vertical stripe on the right of the light-grey vertical stripe represents the packaging material 3 and comprises a narrower vertical stripe portion 23 on the left that is a little bit darker and in a more uniform grey than the wider vertical stripe portion on the right and that represents an area of the longitudinal side portion of the packaging material 3 that is adjacent to the sealing strip 6 and that was heated during heat-sealing of the first longitudinal side portion of the sealing strip 6 but not covered or overlapped by the sealing strip 6, while the wider vertical stripe portion 24 on the right that is a little bit less dark and in a less uniform grey represents the remainder of the packaging material 3 that has not been heated.

FIG. 8 exemplarily shows a thermal digital image of an area of the inner side of the packaging material 3, similar to that shown in FIG. 7 but captured by the thermal imaging camera 20 of the first electronic digital image capture device 17 after the first longitudinal side portion of the sealing strip 6 has been heat-sealed. In the image, the same reference numeral as those in FIG. 7 designate the same portions of the digital image. As in the image shown in FIG. 7, the narrower light-grey vertical stripe represents the entire sealing strip 6, both the first longitudinal side portion heat-sealed to the longitudinal side portion of the packaging material 3 and the loose longitudinal side portion projecting from the longitudinal edge of the packaging material 3; the wider dark-grey vertical stripe on the right of the light-grey vertical stripe represents the packaging material 3, and the narrower dark-grey stripe on the left of the light-grey vertical stripe represents the background. Also in this image, the wider dark-grey vertical stripe on the right in turn comprises a narrower vertical stripe portion on the left that is a little bit less dark than the wider vertical stripe portion on the right and that represents the heat pattern, while the wider vertical stripe portion on the right that is a little bit darker than the narrower vertical stripe portion on the left represents the remainder of the packaging material 3 that has not been heated.

FIG. 9 exemplarily shows a visible-light digital image similar to that shown in FIG. 7 but captured from the outer or décor side of the packaging material 3 by the visible-light imaging camera 19 of the second electronic digital image capture device 18 after the first longitudinal side portion of the sealing strip 6 has been heat-sealed. In the image, the same reference numeral as those in FIGS. 7 and 8 designate the same portions of the digital image. As in the image shown in FIGS. 7 and 8, the narrower light-grey vertical stripe represents the loose longitudinal side portion projecting from the longitudinal edge of the packaging material 3; the narrower dark-grey stripe on the left of the light-grey vertical stripe represents the background; and the wider light-grey vertical stripe on the right of the light-grey vertical stripe represents the packaging material 3.

In an embodiment, the electronic computing resources 14 are further configured to process the captured digital images to automatically detect and identify any faults that may have occurred during the heat-sealing of the sealing strip 6 to the packaging material 3 based on captured digital images.

Figure 10:
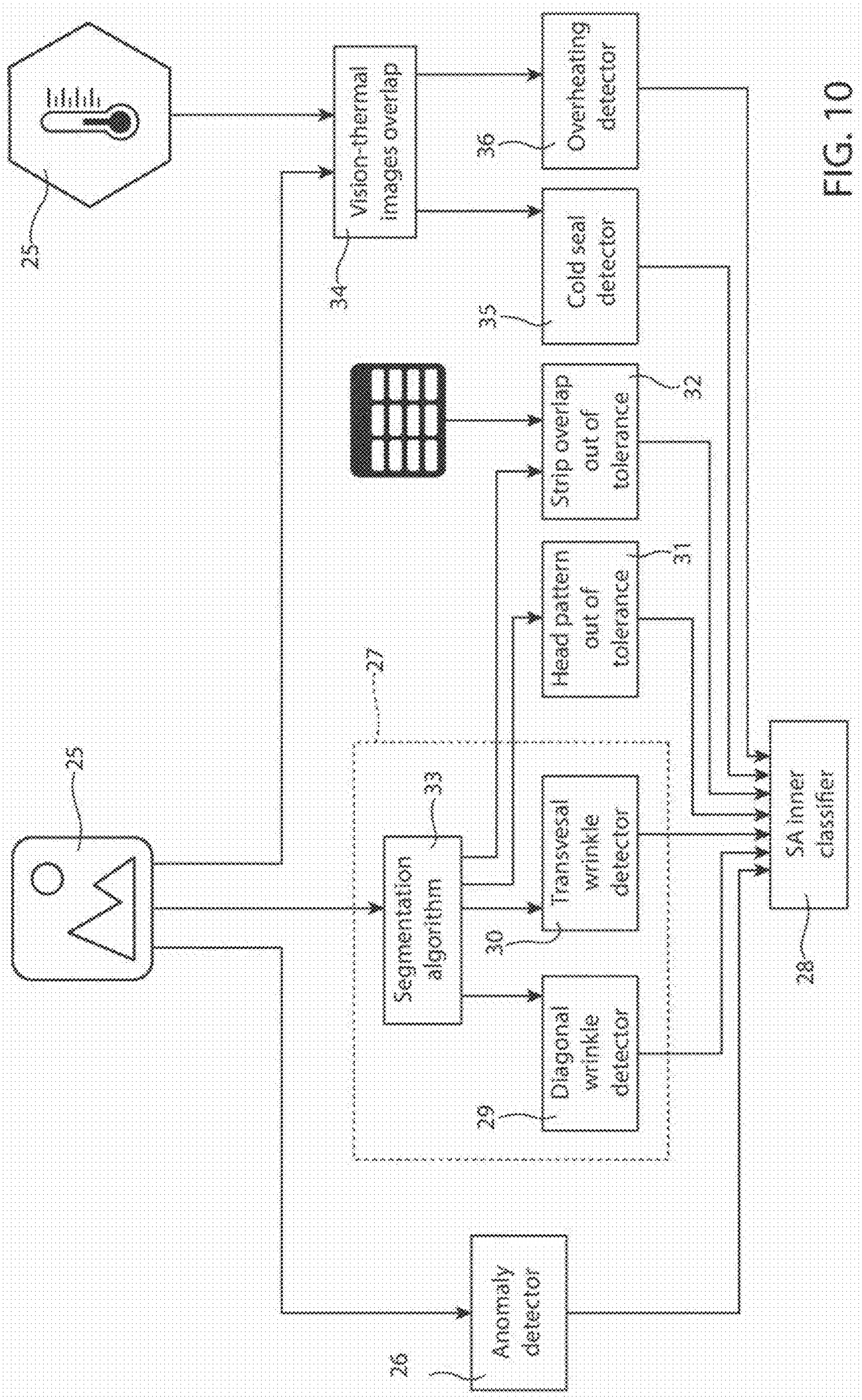
FIG. 10 shows a block diagram of an image processing on a visible-light digital image and a corresponding thermal digital image, such as those shown in FIGS. 7 and 8, of the same area of the inner side of the packaging web and of the sealing strip.

In particular, FIG. 10 shows a block diagram of the image processing carried out by the electronic computing resources 14 on a visible-light digital image and a corresponding thermal digital image, such as those shown in FIGS. 7 and 8, of the same area of the inner side of the packaging web 3 and of the sealing strip 6, In particular, the electronic computing resources 14 are programmed to receive a sequence of pairs of visible-light and thermal digital images and to carry out, for each pair of visible-light and thermal digital images, both an image processing of the received visible-light digital images and an image processing of the pair of visible-light and thermal digital images.

Figure 11A:
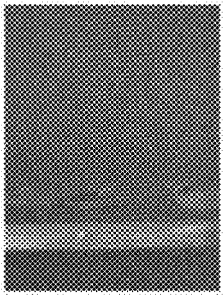
FIGS. 11*a*-11*f* show visible-light digital images featuring marks or patterns representative of typical macro and micro defects or anomalies originated on the packaging web or the sealing strip during the heat-sealing of the sealing strip to the packaging web.
Figure 11B:
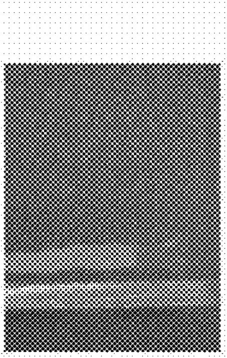

With regard to the image processing of a visible-light digital image, the electronic computing resources 14 are programmed to:

- receive a pair of visible-light and thermal digital images (blocks 25);
- process the received visible-light digital image in search of:
  - marks or patterns representative of typical coarser, major or macro defects or anomalies, such as scratches or delamination exemplarily shown in FIGS. 11*a* and 11*b*, originated in the heat pattern during the heat-sealing of the sealing strip 6 to the packaging web 3 (block 26), and
  - marks or patterns representative of typical finer, minor or micro defects or anomalies, such as particular wrinkles exemplarily shown in the visible-light digital images shown in FIGS. 11*c* to 11*f*, and originated in the heat pattern during the heat-sealing of the sealing strip 6 to the packaging web 3 (block 27).

Output data representative of identified marks or patterns representative of typical macro and micro defects or anomalies is computed and inputted to an inner side classifier (block 28), where the heat sealing of the sealing strip 6 to the packaging web 3 is assessed based on the identified marks or patterns representative of typical macro and micro defects or anomalies, if any.

Figure 11C:
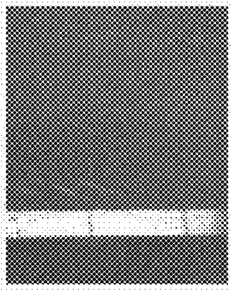
Figure 11D:
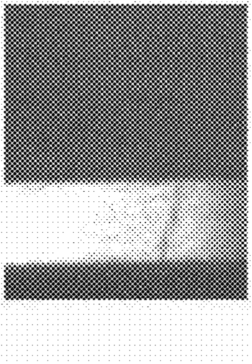
Figure 11E:
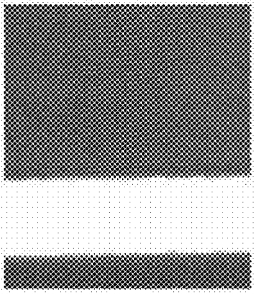
Figure 11F:
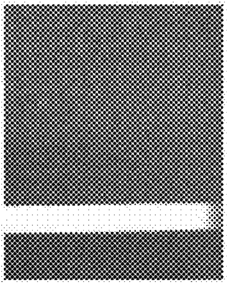

In order to search for marks or patterns representative of typical micro defects or anomalies, a captured visible-light digital image is processed in search of:

- diagonal wrinkles (block 29), such as those shown in the captured visible-light digital image shown in FIG. 11*c*, in the area of the captured visible-light digital image corresponding to the heat pattern, in particular wrinkles inclined by about 45° relative to the longitudinal edge of the sealing strip 6, in particular the longitudinal edge of the longitudinal side portion of the sealing strip 6 heat-sealed to the packaging web 3; the diagonal wrinkles being due to an over-heating of the heat pattern during the heat-sealing of the sealing strip 6 to the packaging web 3; and
- substantially orthogonal wrinkles (block 30), hereinafter referred to as transversal wrinkles, in either one or both of the areas of the captured visible-light digital image corresponding to the sealing strip 6, such as those shown in the visible-light digital image shown in FIG. 11*d*, and to the heat pattern, such as those shown in the digital image shown in FIG. 11*e*, in particular wrinkles inclined by about 90° relative to the longitudinal edge of the sealing strip 6, in particular the longitudinal edge of the longitudinal side portion of the sealing strip 6 heat-sealed to the packaging web 3; the diagonal wrinkles being due to process defects, occurred during the heat-sealing of the sealing strip 6 to the packaging web 3.

Output data representative of any identified diagonal and transversal wrinkles is computed and inputted to the inner side classifier (block 28).

As shown in FIG. 10, a visible-light digital image is further processed to (block 31):

- either store or receive data indicative of a width tolerance range indicative of an expected heat pattern width;
- compute an actual heat pattern width, measured in a direction orthogonal to the longitudinal edge of the sealing strip 6;
- check the actual heat pattern width against the width tolerance range to determine whether the heat pattern is within or out of the width tolerance range; and
- compute indicative of the heat pattern width being within or out of the width tolerance range; and
- input the computed data indicative of the heat pattern width being within or out of the width tolerance range to the inner side classifier, where the heat sealing of the sealing strip 6 to the packaging web 3 is assessed also based on the heat pattern width being within or out of the width tolerance range.

In a different embodiment, the computed heat pattern width may be provided to the inner classifier, where the heat sealing of the sealing strip 6 to the packaging web 3 is assessed also based on the computed heat pattern width.

A visible-light digital image is also processed to (block 32):

- either store or receive data indicative of an overlap tolerance range indicative of an extent the sealing strip 6 is expected to overlap the longitudinal edge of the packaging web 3;
- compute an actual sealing strip overlap, measured in a direction orthogonal to the longitudinal edge of the sealing strip 6, indicative of an extent the sealing strip 6 actually overlaps the longitudinal edge of the packaging web 3;
- check the actual sealing strip overlap against the overlap tolerance range to determine whether the actual sealing strip overlap is within or out of the overlap tolerance range;
- compute data indicative of the actual sealing strip overlap being within or out of the overlap tolerance range; and
- input the computed data indicative of the actual sealing strip overlap being within or out of the overlap tolerance range to the inner side classifier, where the heat sealing of the sealing strip 6 to the packaging web 3 is assessed also based on the computed actual sealing strip overlap being within or out of the overlap tolerance range.

In a different embodiment, the computed actual sealing strip overlap may be provided to the inner classifier, where the heat sealing of the sealing strip 6 to the packaging web 3 is assessed based on the computed actual sealing strip overlap.

The actual heat pattern width and sealing strip overlap are computed by determining and multiplying the number of pixels in the area of the processed visible-light digital image corresponding to the heat pattern and the sealing strip in a direction orthogonal to the longitudinal edge of the sealing strip 6 by a predetermined conversion factor that converts the number of pixels in a heat pattern width and a sealing strip overlap expressed in millimeters.

Figure 12:
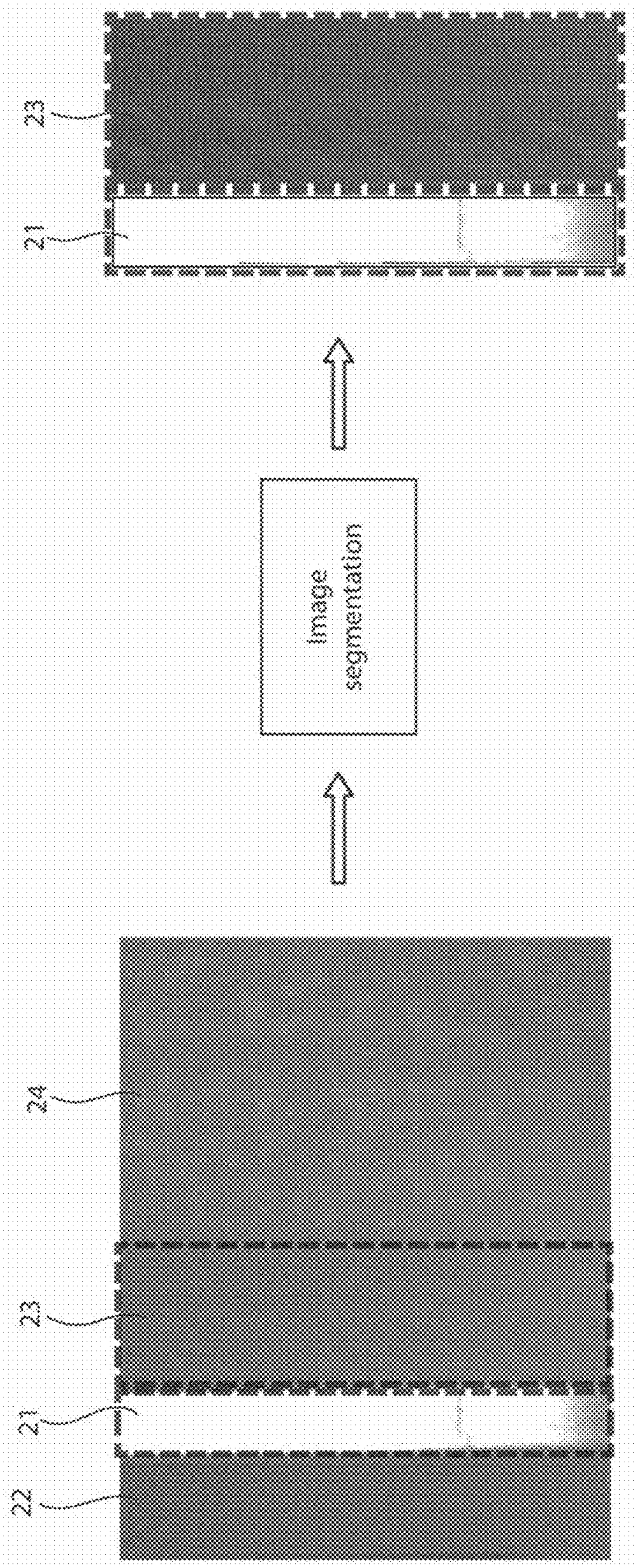
FIG. 12 schematically shows a segmentation of a visible-light digital image.

Conveniently, but not necessarily, processing of a captured visible-light digital image in search of any marks or patterns representative of typical micro defects or anomalies may be carried out by first segmenting (block 33) the visible-light digital image into multiple segments or area (sets of pixels, also known as image objects) corresponding to the sealing strip 6, the heat pattern and the remainder of the packaging web 3 that has not been heated, as shown in FIG. 12, whereby outputting a segmented visible-light digital image comprising only the areas corresponding to the sealing strip 6 and the heat pattern, and then processing the segmented visible-light digital image in search of the above-described micro defects or anomalies as described above.

In particular, the area corresponding to the sealing strip 6 is identified by detecting a significant variation of the pixel brightness in a direction orthogonal to the longitudinal edge of the sealing strip 6 compared to adjacent areas, while the area of the heat pattern is identified by evaluating the color uniformity compared to the adjacent area corresponding to the reminder of the packaging web 3, where the color variance and the average gray level are higher.

Figure 13:
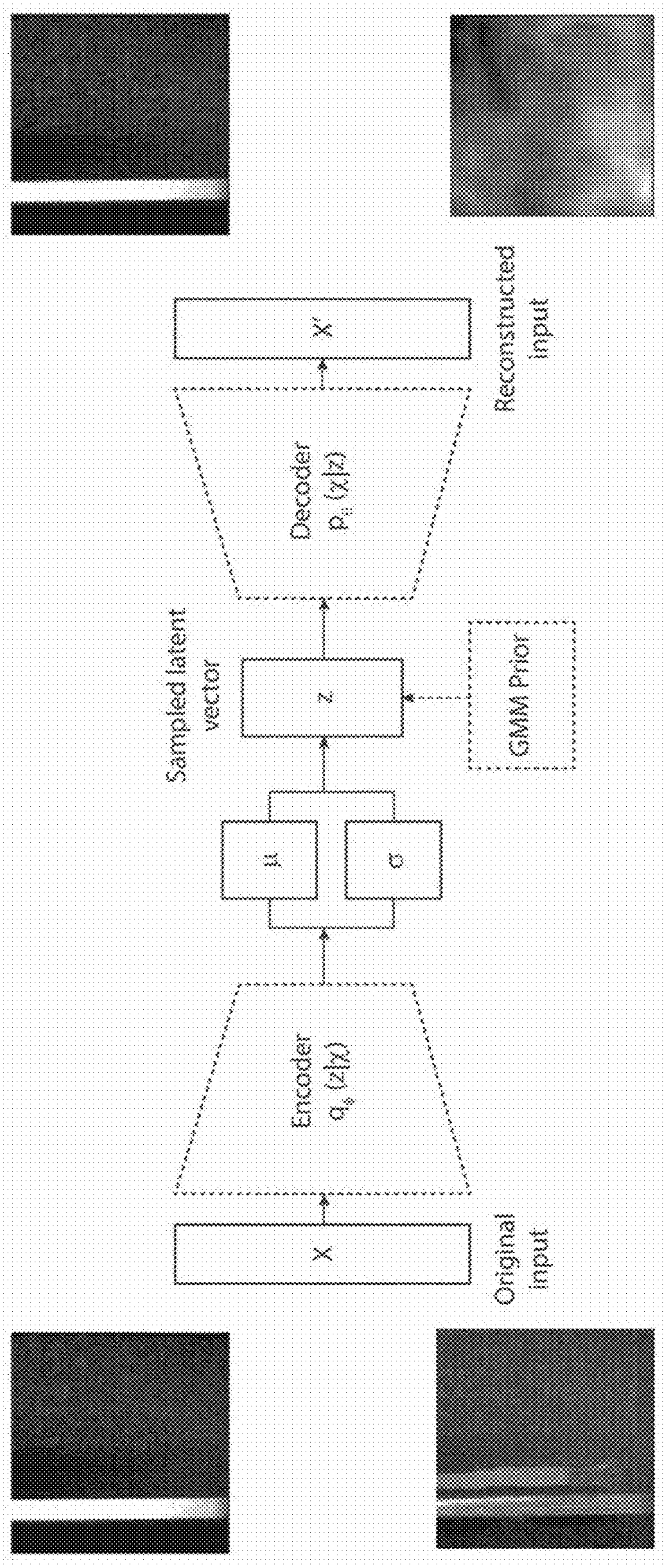
FIG. 13 schematically shows a Variation Auto-Encoder (VAE) artificial neural network architecture for identifying macro defects or anomalies originated in the packaging web during the heat-sealing of the sealing strip to the packaging web.

The processing of a visible-light digital image in search of any marks or patterns representative of typical macro defects or anomalies is conveniently based on a semi-supervised learning and generative modelling, in particular on the artificial neural network architecture known as Variation Auto-Encoder (VAE) shown in FIG. 13, which is trained based on a dataset including only visible-light digital images with no macro defects or anomalies. The visible-light digital images depicted in the right part of FIG. 13 show the outputs of the VAE respectively in a non-anomalous scenario with a low reconstruction error and a high reconstruction probability, namely when no typical macro defect or anomaly is depicted in a processed visible-light digital image, such as that shown in the left-upper part of FIG. 13, and in an anomalous scenario with a high reconstruction error and a low reconstruction probability, namely when a typical macro defect or anomaly is depicted in a processed visible-light digital image, such as that shown in the left-lower part of FIG. 13.

Figure 14:
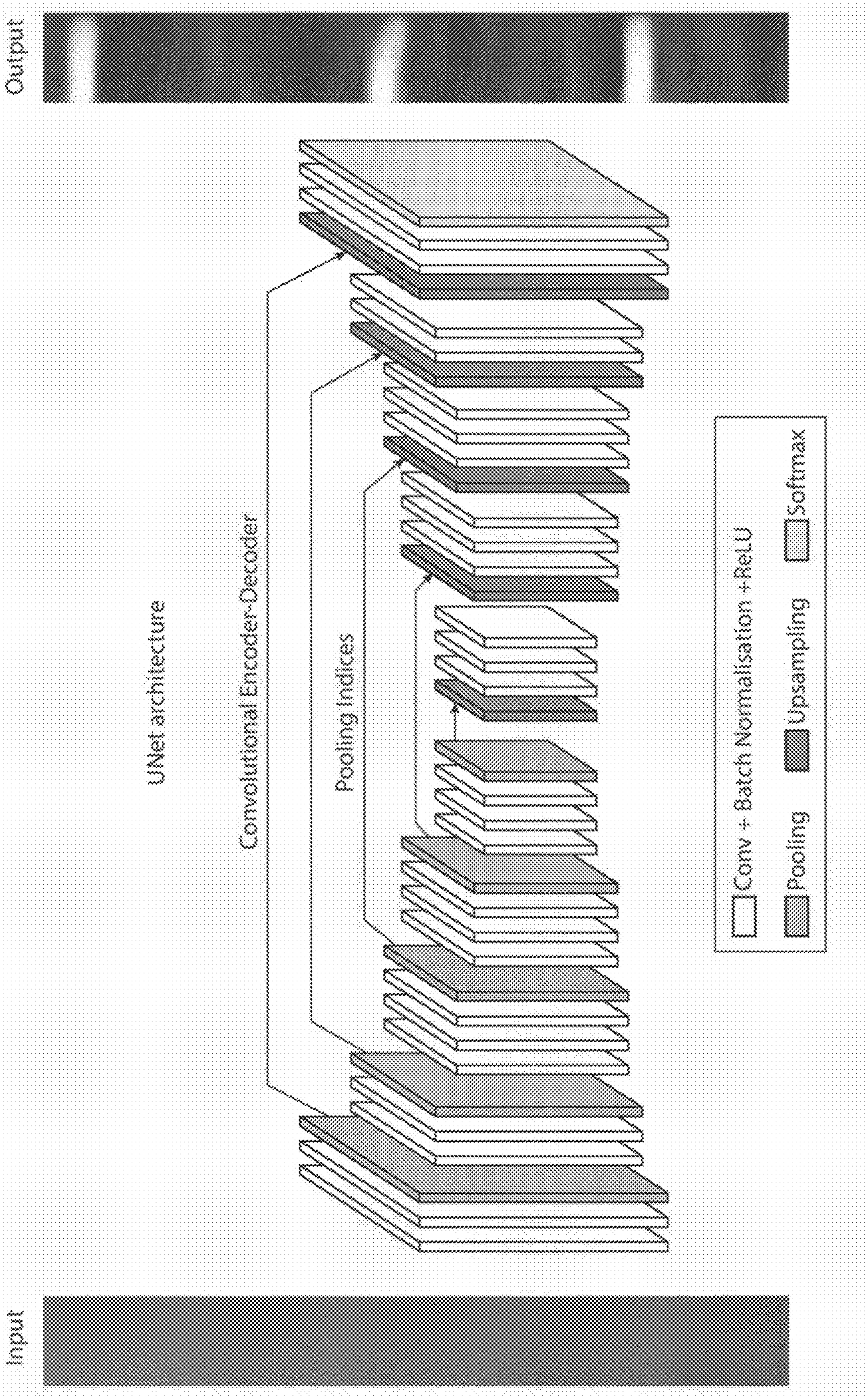
FIG. 14 schematically shows a Convolutional Neural Network (CNN) with a UNet architecture for identifying micro defects or anomalies originated in the packaging web during the heat-sealing of the sealing strip to the packaging web.
Figure 15:
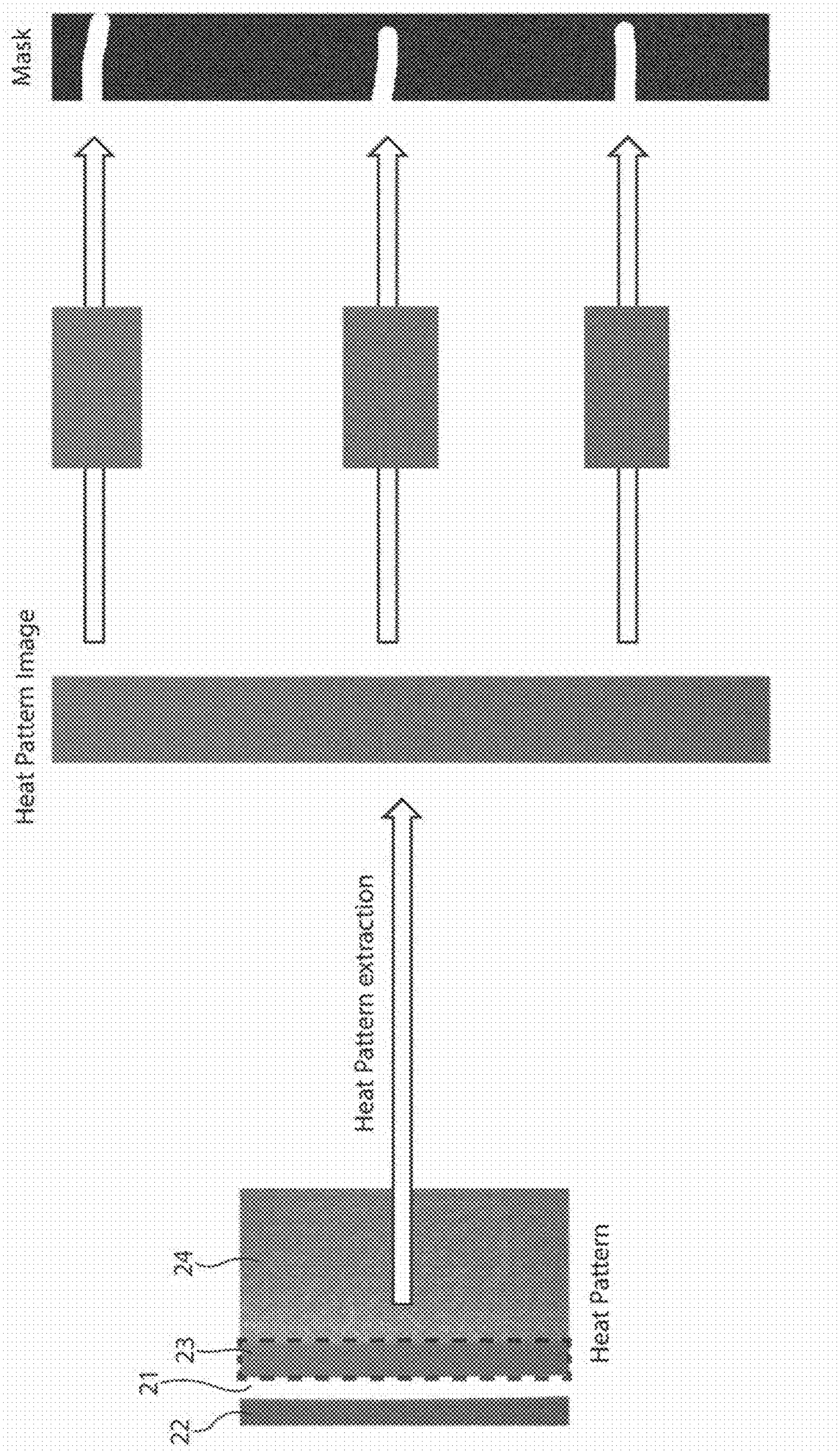
FIG. 15 schematically shows a process of creating and labelling a dataset used for training the UNet shown in FIG. 14.

The processing of a visible-light digital image in search of transversal wrinkles in the heat pattern is conveniently based on a convolutional neural network (CNN) with a UNet architecture exemplarily shown in FIG. 14 and trained based on a dataset created and labelled as schematically shown in FIG. 15.

Figure 16:
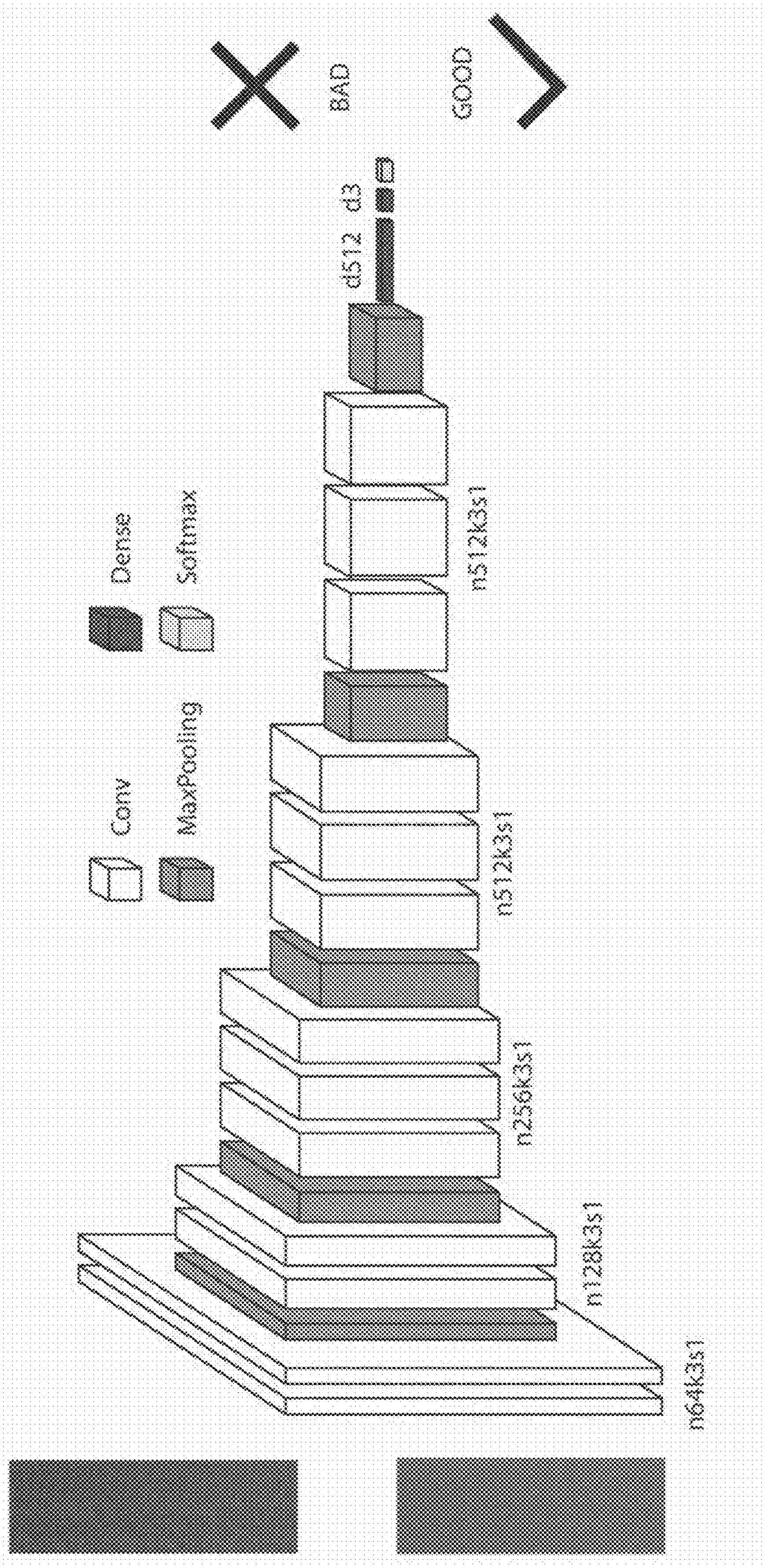
FIG. 16 shows a CNN architecture for identifying micro defects or anomalies originated in the packaging web and/or in the sealing strip during the heat-sealing of the sealing strip to the packaging web.

The processing of a captured visible-light digital image in search of diagonal wrinkles is conveniently based on a convolutional neural network (CNN) architecture exemplarily shown in FIG. 16 and trained based on a dataset including digital images with and without diagonal wrinkles.

With reference again to the block diagram shown in FIG. 10 and with regard to image processing of the visible-light and thermal digital images, the electronic computing resources 14 are programmed to:

- process the received visible-light digital image, hereinafter briefly also referred to as visible-light digital image analysis (block 34), to compute data containing information, hereinafter briefly referred to as geometrical information, indicative of the geometry of the sealing strip 6 and of the heat pattern of the packaging web 3, in particular the positions of the longitudinal edges of the sealing strip 6, of the packaging web 3 and of the heat pattern thereof in a reference frame, conveniently in the form of a coordinate system, with an origin in an appropriate point of the processed visible-light digital image, e.g., either the longitudinal edge of the loose longitudinal portion of the sealing strip 6 that protrudes from the packaging web 3 or the longitudinal edge of the packaging web 3;

process the received thermal digital image, hereinafter briefly also referred to as thermal thermal digital image analysis (block 34), to compute data containing information, hereinafter briefly referred to as thermal information indicative of the temperature profile of the packaging web 3 and of the sealing strip 6 heat-sealed thereto in a direction orthogonal to the longitudinal edge of the packaging web 3 and of the sealing strip 6 in a reference frame, conveniently in the form of a coordinate system, with an origin in an appropriate position of the processed thermal digital image, e.g., either at the longitudinal edge of the longitudinal portion of the sealing strip 6 that is not heat-sealed to the packaging web 3 or at the longitudinal edge of the packaging web 3;

fuse (data fusion), namely combine or merge, the output data of the visible-light digital image analysis and of the thermal thermal digital image analysis (block 34) to compute fused data representative of the combination of the geometrical information obtained from the visible-light digital image analysis with the thermal information obtained from the thermal digital image analysis and based on which any underheating (cold seal) or overheating areas originated during the heat-sealing of the sealing strip 6 to the packaging web 3 may be then identified; and process the fused data to identify any underheating or cold seal (block 35) or overheating (block 36) that may have occurred during the heat-sealing of the sealing strip 6 to the packaging web 3 and output data representative of identified underheating or overheating is computed and inputted to the inner side classifier (block 28).

Figure 17:
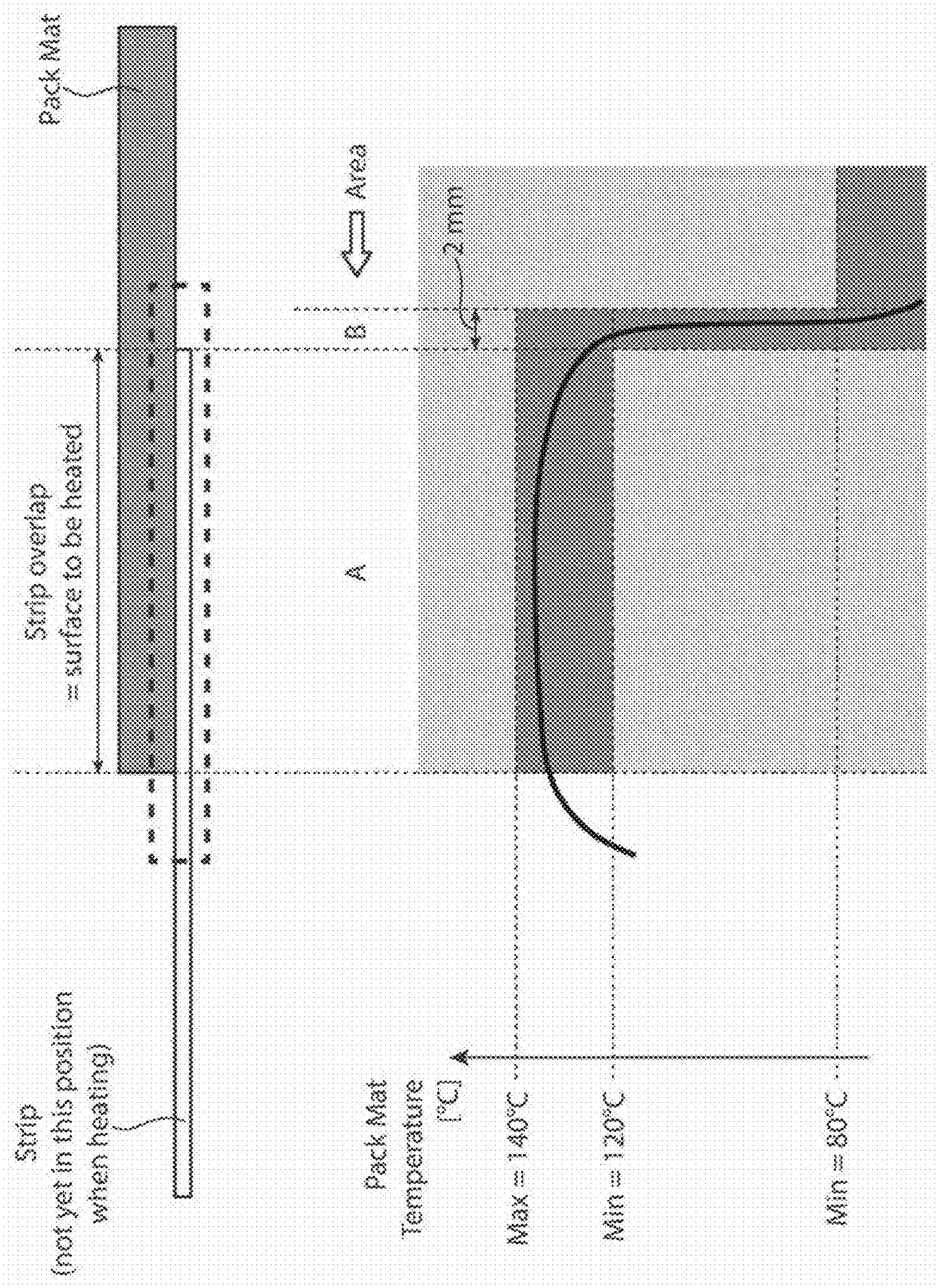
FIG. 17 shows a graphical representation obtained by fusing the output data of visible and thermal digital image analyses of a pair of simultaneously captured visible and thermal digital images.

FIG. 17 shows a graphical representation of the fusion of the output data of the visible-light digital image analysis with the output data of the thermal digital image analysis.

As it may be appreciated, the thermal information from the thermal digital image analysis in the form of the temperature profile of the packaging web 3 and of the sealing strip 6 heat-sealed thereto in a direction orthogonal to the longitudinal edge of the sealing strip 6 is graphically superimposed to the graphical representation of the geometrical information obtained from the visible-light digital image analysis in the form of the geometry of the sealing strip 6 and of the heat pattern of the packaging web 3, thereby allowing any underheating (cold seal) or overheating areas originated during the heat-sealing of the sealing strip 6 to the packaging web 3 to be identified.

In the inner side classifier (block 28) the quality of the heat-sealing of the sealing strip 6 to the inner side of the packaging web 3 is then assessed based on the macro and micro defects identified in the heat pattern and the sealing strip 6, if any, the computed heat patter width and strip overlap, and the identified underheating (cold seal) or overheating, if any, and on a proprietary criterion that is developed to take into account the severity of the above-indicated quantities.

With regard to the computation of the temperature profile of the packaging web 3 and of the sealing strip 6 and with exemplary reference to the thermal digital image shown in FIG. 8, the temperature profile of the packaging web 3 and of the sealing strip 6 is conveniently computed by first identifying in the thermal digital image the left longitudinal border of the sealing strip 6 and then, by using a custom algorithm and proceeding from the left to the right in a direction orthogonal to the sealing strip 6, from the identified left longitudinal border of the sealing strip 6 and to and beyond the right longitudinal border of the sealing strip 6 and throughout the heat pattern, temperature values are computed based on the values of the brightness of the primary colors of the pixels of the thermal digital image.

In order for the computed geometrical and thermal information to be fused correctly, the computed geometrical and thermal information need first to be aligned in the space domain, in particular both in a direction parallel to the sealing strip 6 ad in a direction orthogonal thereto, such that the computed thermal information relates to the same spatial points of the packaging web 3 and the sealing strip 6 as those to which the computed geometrical information relates.

Alignment of the computed geometrical and thermal information results in the visible-light and thermal digital images being notionally superimposable, namely the packaging web 3 and the sealing strip 6 depicted in the visible-light digital image may be notionally superimposed to the packaging web 3 and the sealing strip 6 depicted in the thermal digital image.

Figure 18:
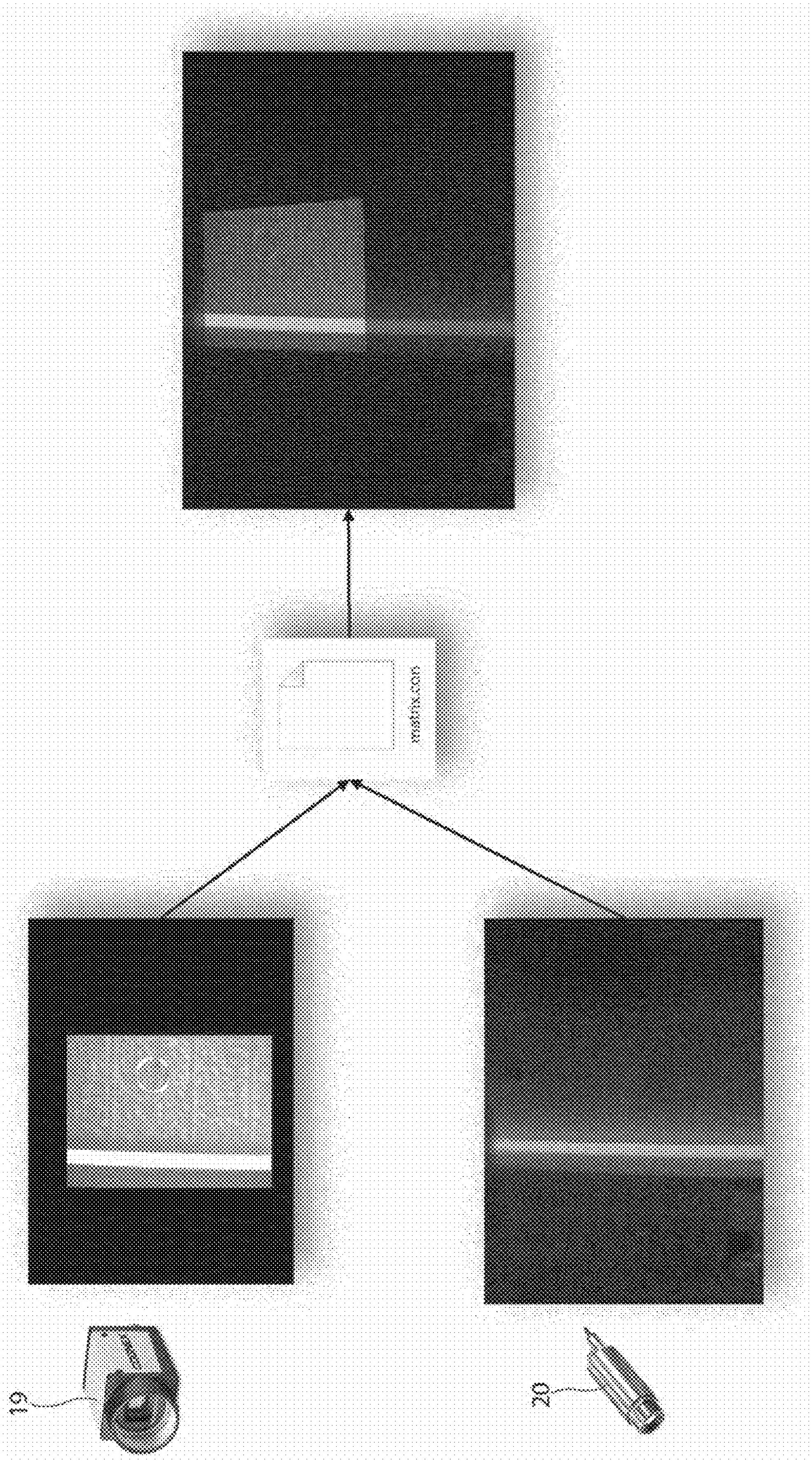
FIG. 18 schematically shows alignment and superimposition of a pair of visible and thermal digital images in the space domain.

FIG. 18 exemplarily shows a combined visible-light and thermal digital image obtained from the superimposition of a visible-light digital image and a corresponding thermal digital image.

To do so, the reference frames of the visible-light and thermal digital images and in which the geometrical and thermal information is referenced need to be mutually spatially/geometrically related via a so-called spatial transformation matrix, which expresses the mutual roto-translation of the two reference frames, such that the sealing strip 6 and the packaging web 3 in the visible-light digital image may be related to the sealing strip 6 and the packaging web 3 in the thermal digital image.

A calibration of the visible-light and thermal imaging cameras 19, 20 of each electronic digital image capture device 17, 18 is hence carried out to compute the transformation matrix which, during runtime performance of the heat-seal quality control, will be used to align each pair of visible-light and thermal digital images.

The calibration of the visible-light and thermal imaging cameras is carried out using a calibration marker 21 designed to comprise or exhibit a calibration pattern 22 such that, when the calibration marker 21 is steadily arranged in the fields of view (FOV) of the visible-light and thermal imaging cameras 19, 20 of each electronic digital image capture device 17, 18 and the visible-light and thermal imaging cameras 19, 20 are simultaneously or successively operated, the calibration pattern 22 is imaged, i.e., is visible, in both the visible-light digital image and in the thermal digital image captured by the visible-light and thermal imaging cameras 19, 20, respectively, whereby allowing the spatial transformation matrix to be computed based on the positions and orientations of the patterns imaged in the visible and thermal digital images.

Figure 19A:
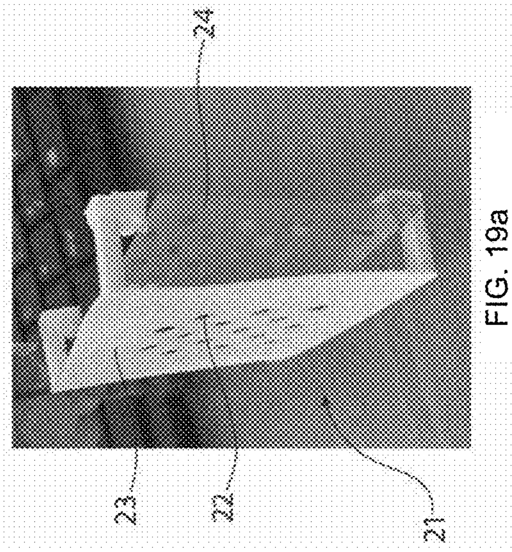
FIGS. 19*a*, 19*b* and 19*c* show a calibration marker used to calibrate visible and thermal imaging cameras.
Figure 19B:
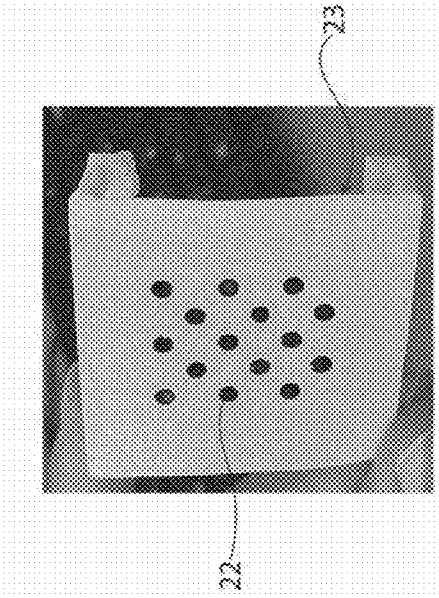
Figure 19C:
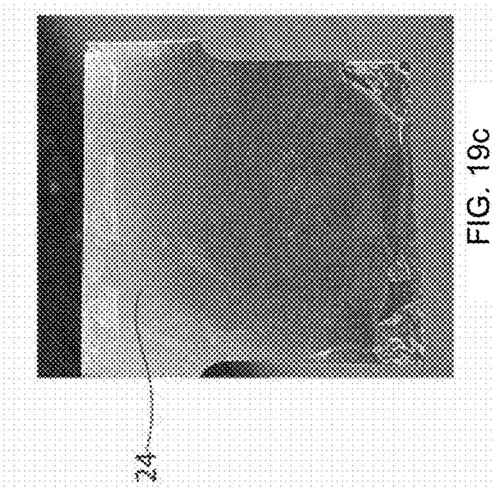

In an embodiment shown in FIGS. 19*a* to 19*c*, the calibration marker 21 comprises a foreground member 23 intended to be arranged in the foreground with respect to the visible-light and thermal imaging cameras 19, 20 and carrying the calibration pattern 22 in the form of a through-passing pattern, and a background member 24 intended to be arranged behind the foreground member 23 with respect to the visible-light and thermal imaging cameras 19, 20 so as to be exposed, i.e., visible, in the foreground through the through-passing pattern 22.

In the embodiment shown in FIGS. 19*a* to 19*c*, the background member 24 is in the form of a foil, e.g., an aluminum foil, and the foreground member 23 comprises a plate 25 with the calibration pattern 22 formed therethrough, and a support and coupling structure 26 integral with the plate 25 and designed to allow the background member 24 to be easily and removably coupled/retained behind the plate 25 and the plate 25 with the background member 24 coupled thereto to be steadily placeable in the fields of view of the visible and thermal imaging cameras 19, 20.

In the embodiment shown in FIGS. 19*a* to 19*c*, the calibration pattern 22 is in the form of a grid of offset rows of through-passing holes, namely a grid of through-passing holes wherein the through-passing holes in a row are offset with respect to the through-passing holes in an adjacent row.

The foreground member 23 and the background member 24 are made of materials with different emissivity, in particular the foreground member 23 is made of a material, e.g., PLA plastic, with a lower emissivity than the (higher) emissivity of the material, e.g., aluminum, of the background member 24, whereby, when the background member 24 is appropriately heated, the heated areas of the background member 24 exposed through the through-passing pattern 22 may be imaged in a thermal digital image and forms a corresponding calibration pattern, while the remainder of the background member 24 may not be imaged in a thermal digital image because shielded by the foreground member 23.

In this way, the calibration pattern 22 formed in the foreground member 23 may be imaged in a visible-light digital image and, after the background member 24 has been appropriately heated, the corresponding pattern formed by the heated areas of the background member 24 exposed through the calibration pattern 22 formed in the foreground member 23 may be also imaged in a thermal digital image.

Figure 20A:
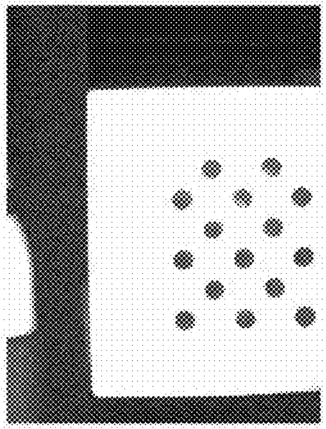
FIGS. 20*a* and 20*b* show calibration patterns exhibited by the calibration marker shown in FIG. 19*a*-19*c* and imaged in a visible-light digital image and in a thermal digital image.
Figure 20B:
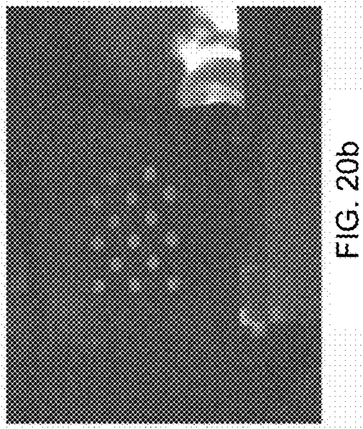

FIG. 20*a* shows the calibration pattern 22 formed in the foreground member 23 and imaged in a visible-light digital image, while FIG. 20*b* shows the corresponding pattern formed by the heated areas of the background member 24 exposed through the calibration pattern 22 formed in the foreground member 23 and imaged in a thermal digital image.

Calibration of the output data of the visible and thermal imaging cameras 19, 20 of each electronic digital image capture device 17, 18 thus requires:

- heating the background member 24 of the calibration marker 21;
- arranging the calibration marker 21 in the fields of view of the visible-light and thermal imaging cameras 19, 20;
- operating the visible-light and thermal imaging cameras 19, 20 to capture a visible-light digital image and a thermal digital image featuring respective calibration patterns;
- processing the captured visible-light and thermal digital images to identify the calibration patterns featured therein;
- computing positions and orientations of the calibration patterns featured in the visible-light and digital images; and
- computing the space transformation matrix based on the positions and orientations of the calibration patterns featured in the visible-light and digital images.

To this purpose, the electronic computing resources 14 are further programmed to:

- operate, either simultaneously or successively, the visible-light and thermal imaging cameras 19, 20 to capture a visible-light digital image and a thermal digital image featuring respective calibration patterns;
- process the captured visible-light and thermal digital images to identify the calibration patterns featured therein and compute their positions and orientations; and
- compute the space transformation matrix based on the computed positions and orientations of the calibration patterns featured in the visible-light and digital images.

Figure 21:
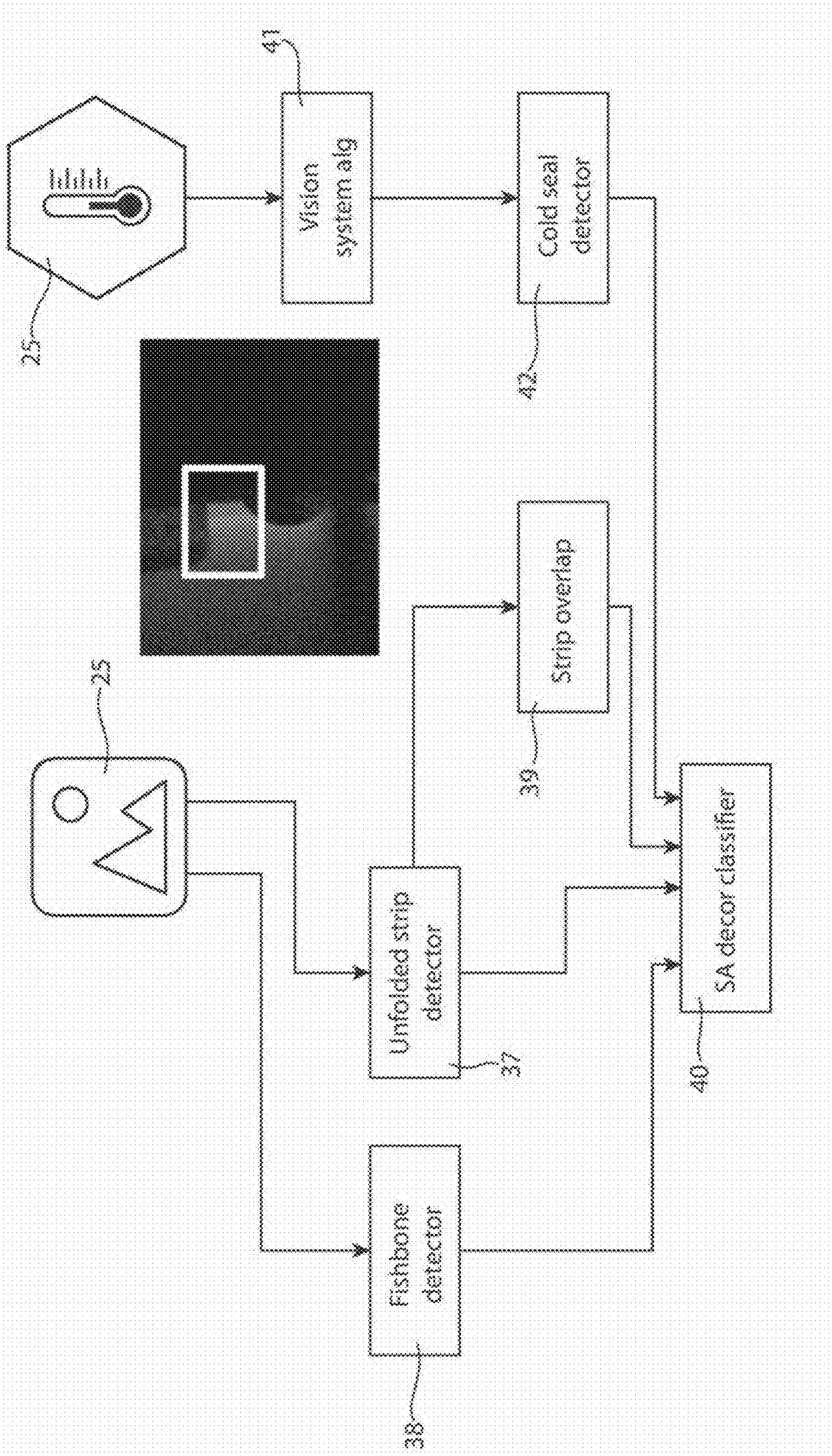
FIG. 21 shows a block diagram of an image processing on a visible-light digital image and a corresponding thermal digital image, such as those shown in FIGS. 7 and 8, of the same area of the outer side of the packaging web and of the sealing strip.

FIG. 21 shows a block diagram of the image processing carried out by the electronic computing resources 14 on captured visible-light and thermal digital images of one and the same area of the outer or décor side of the packaging web 3 and of the sealing strip 6, where the visible-light digital image is such as that shown in FIG. 9.

For convenience, in the block diagram shown in FIG. 20 those blocks that relate to processings that are similar or correspond to those that have been previously described with reference to the block diagram shown in FIG. 10 have been referenced with the same reference numerals as those in FIG. 10.

As shown in FIG. 21, a visible-light digital image is processed to determine whether the sealing strip 6 is U-folded around the longitudinal edge of the packaging web 3 (block 37) and whether one or more marks similar to "fishbones", such as that shown in FIG. 21, have formed during U-folding and heat-sealing of the sealing strip 6 of to the packaging web 3 (block 38).

If the sealing strip 6 is determined to be U-folded, an actual sealing strip overlap, measured in a direction orthogonal to the longitudinal edge of the sealing strip 6, is computed (block 39) as previously described with reference to block 32 shown in FIG. 10.

A thermal digital image is instead processed to identify an area of the thermal digital image with predefined characteristics, in particular an area with a predefined brightness pattern, such as that enclosed in the red rectangle shown in the thermal digital image reproduced in FIG. 21 (block 41), and the identified area of the thermal digital image is then processed in search of underheating (cold seal) that may have occurred during the heat-sealing of the sealing strip 6 to the packaging web 3 (block 42), as previously described with reference to block 35 shown in FIG. 10.

The quality of the heat-sealing of the sealing strip 6 to the packaging web 3 is then evaluated in an outer side classifier (block 40) similar to the inner side classifier shown in FIG. 10 with reference to block 28 also based on the above-indicated quantities and on proprietary criteria which takes into account the severity of the above-indicated quantities.

Figure 22:
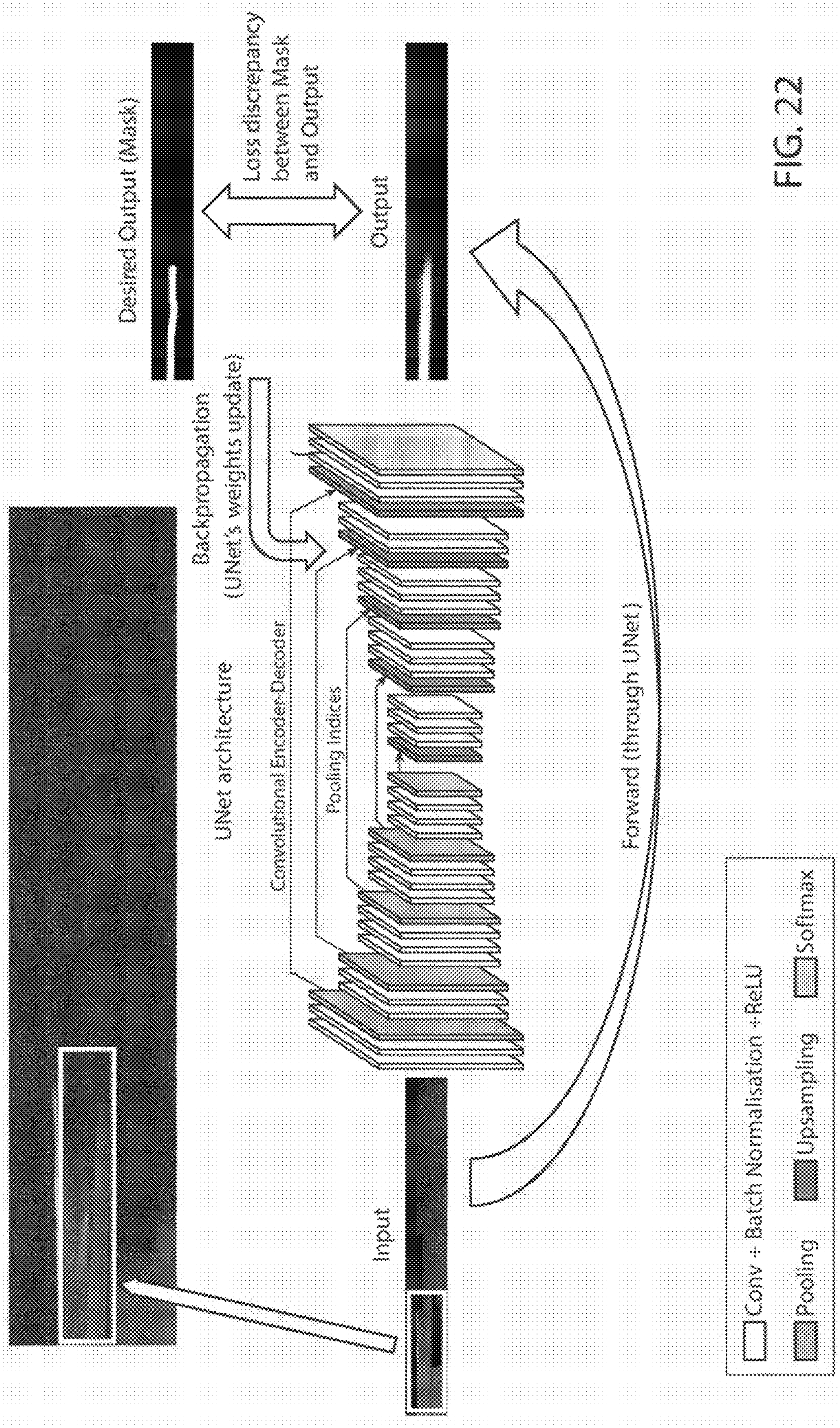
FIG. 22 schematically shows a Convolutional Neural Network (CNN) with a UNet architecture for identifying fishbones in the sealing strip heat-sealed to the packaging web.
Figure 23:
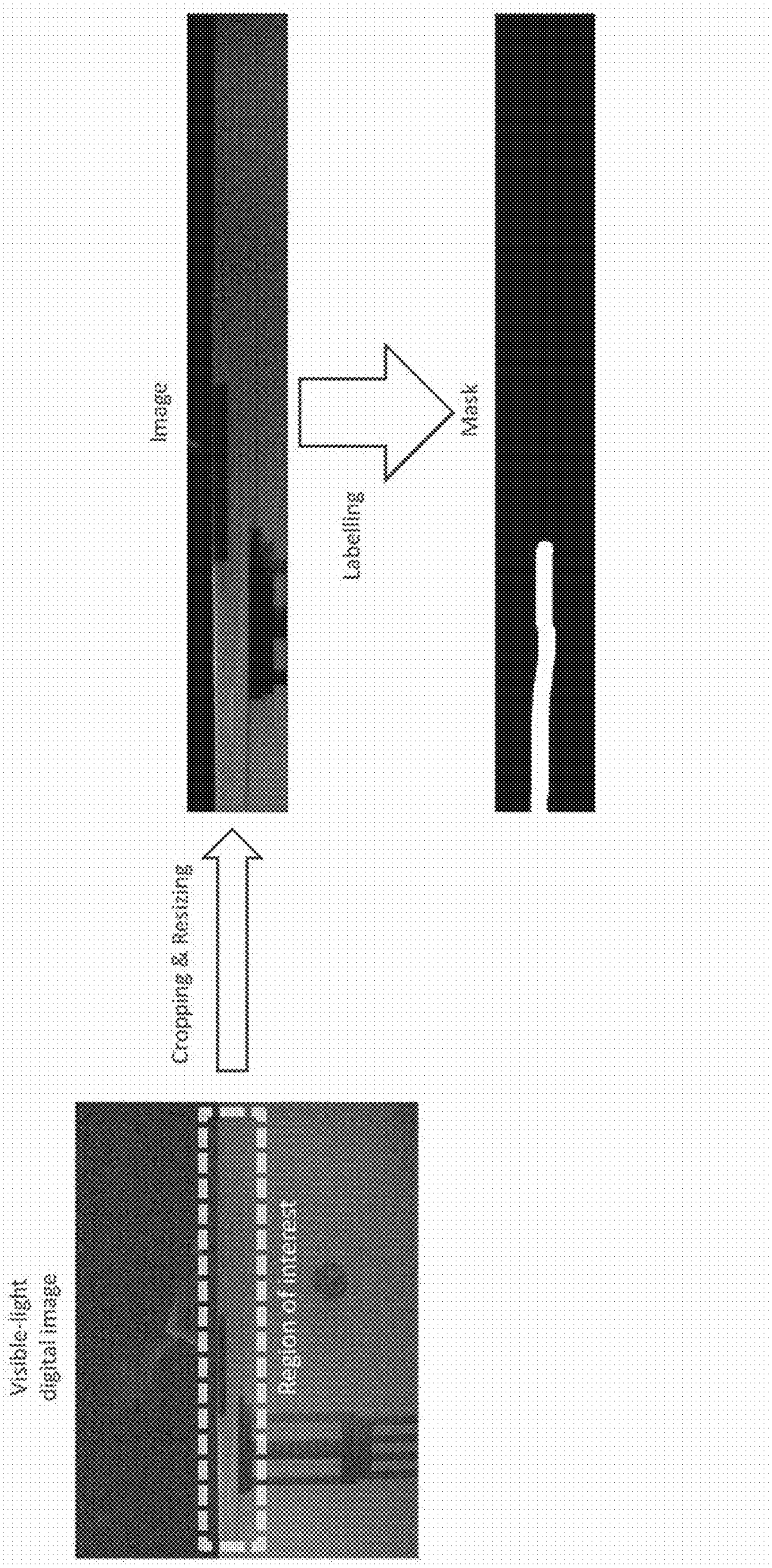
FIG. 23 schematically shows a process of creating and labelling a dataset used for training the UNet shown in FIG. 22.

In order to detect the presence and the number of "fishbones" in a visible-light digital image, a deep learning algorithm is used based on a UNet network exemplarily shown in FIG. 22 and trained based on a dataset created and labelled as schematically shown in FIG. 23.

Figure 24:
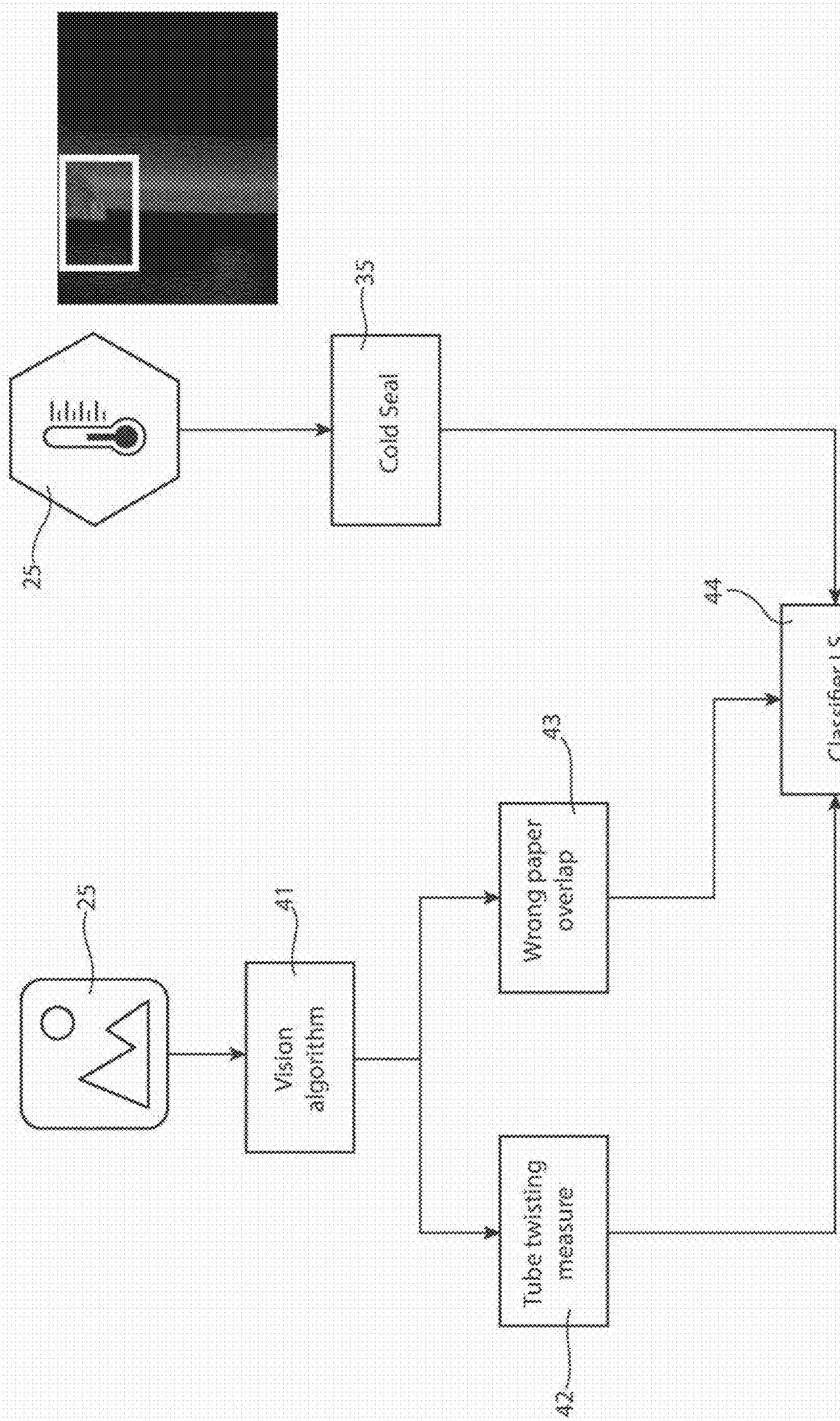
FIG. 24 shows a block diagram of an image processing on a visible-light digital image and a corresponding thermal digital image, such as those shown in FIGS. 7 and 8, of the same area of the longitudinal sealing of the packaging web.

In the end, FIG. 24 shows a block diagram of the image processing carried out by the electronic computing resources 14 on captured visible-light and thermal digital images of an area of the longitudinal sealing of the vertical tube 2, after the packaging web 3 has been folded and the longitudinal edges thereof have been heat-sealed.

As shown in FIG. 24, a visible-light digital image is processed to identify an area of the thermal digital image with predefined characteristics, in particular an area with a predefined brightness pattern, such as that enclosed in the red rectangle shown in the visible-light digital image reproduced in FIG. 210 (block 41), and the identified area of the visible-light digital image is then processed to determine whether the vertical tube 2 got twisted during vertical sealing (block 42) and whether the longitudinal edges of packaging web 3 have wrongly overlapped (block 43).

Output data representative of whether the vertical tube 2 got twisted during vertical sealing and the longitudinal edges of packaging web 3 have wrongly overlapped is computed and inputted to an longitudinal sealing classifier (block 44) similar to the inner and outer side classifiers shown in FIGS. 10 and 21.

The thermal digital image is instead processed in search of marks indicative of any underheating (cold seal) occurred during the heat-sealing of the sealing strip 6 to the packaging web 3, as previously described with reference to block 35 shown in FIG. 10.

Output data representative of identified marks indicative of any underheating (cold seal) is computed and inputted to the longitudinal sealing classifier (block 44), where the quality of the longitudinal sealing of the vertical tube 2 s assessed based on proprietary criteria which takes into account the severity of the identified features.

The advantages that the present invention allows to achieve may be readily appreciated by the skilled person.

In particular, the present invention allows the quality of the heat-sealing of the sealing strip to the packaging web to be automatically checked by means of a simple but robust and reliable optical imagery technology and significantly improved compared to a heat-sealing quality check made by an appropriately trained operator.

The invention claimed is:

1. An automatic heat-sealing quality control system to automatically control a quality of a heat-sealing of a sealing strip to a longitudinal edge of a packaging web at a heat-sealing station in a packaging machine, where sealed packages containing pourable food products are continuously produced from a continuous vertical tube filled with the pourable food product and formed by longitudinally folding the packaging web to overlap longitudinal edges thereof and then heat-sealing the overlapping longitudinal edges;

the system comprises:

a sensory system arranged at the heat-sealing station to output an output that allows the quality of the heat-sealing of the sealing strip to the longitudinal edge of the packaging web to be evaluated; and electronic computing resources designed to communicate with the sensory system to receive and process the output thereof to automatically evaluate the quality of the heat-sealing of the sealing strip to the longitudinal edge of the packaging web;

the sensory system comprises an artificial vision system to capture digital images of the packaging web and of the sealing strip;

the artificial vision system comprises:

a thermal imaging camera designed to operate in the electromagnetic spectrum invisible to human eye to capture and output thermal digital images.

2. The system of claim 1, wherein the electronic computing resources are configured to:

operate the thermal imaging camera to capture a thermal digital image of the packaging material and the sealing strip;

receive the captured thermal digital image;

process the received thermal digital image to:

identify an area of the thermal digital image with predefined characteristics, in particular a predefined brightness pattern;

process the identified area of the thermal digital image to identify a thermal signature of the heat-sealing of the sealing strip to the longitudinal edge, in particular underheating or cold seal, if any, that may have occurred during the heat-sealing of the sealing strip to the packaging web; and evaluate the quality of the heat-sealing of the sealing strip to the packaging web based on the identified thermal signature.

3. The system of claim 1, wherein the artificial vision system further comprises:

a visible-light imaging camera designed to operate in the electromagnetic spectrum visible to human eye to capture and output visible-light digital images;

and the electronic computing resources are further configured to:

operate the visible-light imaging camera to capture a visible-light digital image of the packaging material and the sealing strip;

receive the captured visible-light digital image;

process the received visible-light digital image in search of:

marks or patterns representative of macro defects or anomalies, such as scratches or delamination, that may form during the heat-sealing of the sealing strip to the packaging web, and marks or patterns representative of micro defects or anomalies, such as wrinkles, that may form during the heat-sealing of the sealing strip to the packaging web; and evaluate the quality of the heat-sealing of the sealing strip to the packaging web also based on the identified marks or patterns.

4. The system of claim 3, wherein the electronic computing resources are further configured to process the received visible-light digital image in search of marks or patterns representative of macro and micro defects or anomalies in a heat pattern of the packaging web defined as an area of the packaging web that is adjacent to the sealing strip and that was heated during heat-sealing of the sealing strip to the packaging web but not covered by the sealing strip.

5. The system of claim 4, wherein the electronic computing resources are further configured to process the received visible-light digital image in search of marks or patterns representative of micro defects or anomalies comprising:

diagonal wrinkles in the heat pattern of the packaging web; and transversal wrinkles in either one or both of the sealing strip and the heat pattern of the packaging web.

6. The system of claim 3, wherein the electronic computing resources are further configured to process the received visible-light digital image to:

compute an actual heat pattern width, measured in a direction orthogonal to the sealing strip of a heat pattern representing an area of the packaging web that is adjacent to the sealing strip and that was heated during heat-sealing of the sealing strip to the packaging web but not covered by the sealing strip; and evaluate the quality of the heat-sealing of the sealing strip to the packaging web also based on the computed heat pattern width.

7. The system of claim 3, wherein the electronic computing resources are further configured to process the received visible-light digital image to:

compute an actual sealing strip overlap, measured in a direction orthogonal to the sealing strip, indicative of an extent the sealing strip actually overlaps the packaging web; and evaluate the quality of the heat-sealing of the sealing strip to the packaging web also based on the computed actual sealing strip overlap.

8. The system of claim 3, wherein the visible-light and thermal imaging cameras are arranged with respect to the packaging web and the sealing strip to capture visible-light and thermal digital images of one and the same area of one and the same face of the packaging material and of the sealing strip; and the electronic computing resources are further configured to:

operate the visible-light and thermal imaging cameras to capture a pair of visible-light and thermal digital images of the packaging material and the sealing strip;

receive the pair of captured visible-light and thermal digital images;

carry out a visible-light digital image analysis of the received visible-light digital image to compute, and output data containing, geometrical information representative of the geometry of the sealing strip and of a heat pattern of the packaging web in a reference frame with an origin in an appropriate point of the processed visible-light digital image;

carry out a thermal digital image analysis of the received thermal digital image to compute, and output data containing, thermal information representative of a temperature profile of the packaging web and of the sealing strip in a direction orthogonal to the packaging web and the sealing strip in a reference frame with an origin in an appropriate position of the processed thermal digital image;

fuse the geometrical information obtained from the visible-light digital image analysis with the thermal information obtained from the thermal digital image analysis to compute fused data representative of the fused information;

process the fused data to identify underheating or cold seal or overheating, if any, that may have occurred during the heat-sealing of the sealing strip to the packaging web; and evaluate the quality of the heat-sealing of the sealing strip to the packaging web based on the identified underheating or overheating.

9. A packaging machine operable to continuously produce sealed packages containing pourable food products from a continuous vertical tube filled with the pourable food product and formed by longitudinally folding a packaging web to overlap longitudinal edges thereof and then heat-sealing the overlapping longitudinal edges;

the packaging machine comprises an automatic heat-sealing quality control system as claimed in claim 1.

10. An automatic heat-sealing quality control system to automatically control a quality of a heat-sealing of a sealing strip to a longitudinal edge of a packaging web at a heat-sealing station in a packaging machine, where sealed packages containing pourable food products are continuously produced from a continuous vertical tube filled with the pourable food product and formed by longitudinally folding the packaging web to overlap longitudinal edges thereof and then heat-sealing the overlapping longitudinal edges;

the system comprises:

a sensory system arranged at the heat-sealing station to output an output that allows the quality of the heat-sealing of the sealing strip to the longitudinal edge of the packaging web to be evaluated; and electronic computing resources designed to communicate with the sensory system to receive and process the output thereof to automatically evaluate the quality of the heat-sealing of the sealing strip to the longitudinal edge of the packaging web;

the sensory system comprises an artificial vision system to capture digital images of the packaging web and of the sealing strip;

the artificial vision system comprises:

a thermal imaging camera designed to operate in the electromagnetic spectrum invisible to human eye to capture and output thermal digital images; and a visible-light imaging camera designed to operate in the electromagnetic spectrum visible to human eye to capture and output visible-light digital images;

and the electronic computing resources are further configured to:

operate the visible-light imaging camera to capture a visible-light digital image of the packaging material and the sealing strip;

receive the captured visible-light digital image;

process the received visible-light digital image in search of:

marks or patterns representative of macro defects or anomalies, such as scratches or delamination, that may form during the heat-sealing of the sealing strip to the packaging web, and marks or patterns representative of micro defects or anomalies, such as wrinkles, that may form during the heat-sealing of the sealing strip to the packaging web; and evaluate the quality of the heat-sealing of the sealing strip to the packaging web also based on the identified marks or patterns, and wherein the electronic computing resources are further configured to process the received visible-light digital image to:

determine whether the sealing strip is U-folded around a longitudinal edge of the packaging web and marks similar to fishbones have formed in the sealing strip during U-folding and heat-sealing of the sealing strip to the packaging web;

if the sealing strip is determined to be U-folded, compute an actual sealing strip overlap, measured in a direction orthogonal to the sealing strip, indicative of an extent the sealing strip actually overlaps the packaging web; and evaluate the quality of the heat-sealing of the sealing strip to the packaging web also based on the determination as to whether the sealing strip is U-folded around a longitudinal edge of the packaging web, on whether marks similar to fishbones have formed in the sealing strip during U-folding and heat-sealing of the sealing strip to the packaging web, and on the computed actual sealing strip overlap.

11. The system of claim 10, wherein the electronic computing resources are further configured to align the geometrical information with the thermal information in the space domain, both in a direction parallel to the sealing strip and in a direction orthogonal thereto, such that the computed thermal information relates to the same spatial points of the packaging web and the sealing strip to which the computed visible-light information relates;

in order to align the geometrical information with the thermal information in the space domain, the electronic computing resources are further configured to compute a spatial transformation matrix which mutually relates the reference frames in which the geometrical and thermal information is referenced in the visible-light and thermal digital images, such that the sealing strip and the packaging web images in the visible-light digital image may be related to the sealing strip and the packaging web imaged in the thermal digital image;

in order for the spatial transformation matrix to be computed, the system comprises a calibration marker designed to exhibit a calibration pattern imageable both in a visible-light digital image and in a thermal digital image;

and the electronic computing resources are further configured to compute the spatial transformation matrix based on the position and orientation of the calibration pattern imaged both in a visible-light digital image and in a thermal digital image.

12. The system of claim 11, wherein the calibration marker comprises a foreground member intended to be arranged in the foreground with respect to the visible-light and thermal imaging cameras and carrying the calibration pattern in the form of a through-passing pattern; and a background member intended to be arranged behind the foreground member with respect to the visible-light and thermal imaging cameras so as to be exposed in the foreground through the calibration pattern;

the foreground member and the background member are made of materials with different emissivity whereby, the calibration pattern formed in the foreground member may be imaged in a visible-light digital image and, when the background member is heated, the heated areas of the background member exposed in the foreground through the calibration pattern formed in the foreground member may be imaged in a thermal digital image and forms a corresponding calibration pattern, while the remainder of the background member is not imaged in the thermal digital image because shielded by the foreground member.

* * * * *